United States Patent
Anzawa et al.

(10) Patent No.: US 6,670,789 B2
(45) Date of Patent: Dec. 30, 2003

(54) VOLTAGE EQUALIZING APPARATUS FOR BATTERY DEVICES

(75) Inventors: Seiichi Anzawa, Nagano (JP); Hiroshi Nishizawa, Nagano (JP); Fujio Matsui, Tokyo (JP)

(73) Assignees: Nagano Japan RdaioCo., Nagano (JP); Fuji Jakogyo Kabusgiki Kaisha, Tokyo (JP)

( * ) Notice: Subject to any disclaimer, the term of this patent is extended or adjusted under 35 U.S.C. 154(b) by 0 days.

(21) Appl. No.: 10/357,266

(22) Filed: Feb. 3, 2003

(65) Prior Publication Data

US 2003/0141843 A1 Jul. 31, 2003

Related U.S. Application Data

(62) Division of application No. 09/989,610, filed on Nov. 20, 2001.

(30) Foreign Application Priority Data

Nov. 21, 2000 (JP) .......................................... 2000-354096
Sep. 28, 2001 (JP) .......................................... 2001-304003

(51) Int. Cl.$^7$ .................................................. H02J 7/00

(52) U.S. Cl. ...................................... 320/118; 320/116

(58) Field of Search ................................. 320/119, 118, 320/116, 117; 363/20, 15, 37

(56) References Cited

U.S. PATENT DOCUMENTS 6,373,223 B1 * 4/2002 Anzawa et al. ............. 320/118

* cited by examiner

Primary Examiner—Lawrence Luk
(74) Attorney, Agent, or Firm—Smith, Gambrell & Russell

(57) ABSTRACT

A voltage equalizing apparatus for battery devices includes a core, a plurality of first battery devices interconnected in series with each other, each consisting of one or more cells, a plurality of secondary windings magnetically connected with each other through the core, a plurality of first switching devices, each connected to one of the plurality of secondary windings and one of the plurality of first battery devices to constitute a first closed circuit, one or more second battery devices provided separately from said plurality of first battery devices interconnected in series or a second battery device provided by rendering the whole of said plurality of first battery devices interconnected in series one battery device, a primary winding magnetically connected with the plurality of secondary windings through the core, and a second switching device connected in series with the second battery device and the primary winding to constitute a second closed circuit. The plurality of first switching devices and the plurality of second switching device are alternately turned ON and OFF to equalize the output voltages of the first battery devices. The plurality of first switching devices continue to be turned ON after exciting energy stored in the core is transported by the charging to the battery devices having lower voltages among said plurality of first battery devices, to effect the charging from the battery devices having higher voltages among said plurality of first battery devices to the battery devices having lower voltages among said plurality of first battery devices and/or to store energy in said core.

7 Claims, 18 Drawing Sheets

VOLTAGE EQUALIZING APPARATUS FOR BATTERY DEVICES

REFERENCE TO RELATED APPLICATION

This application is a division of application Ser. No. 09/989,610 filed on Nov. 20, 2001, which is relied on and incorporated herein by reference.

BACKGROUND OF THE INVENTION

1. Field of the Invention

The present invention relates to an apparatus for performing energy transfer among a plurality of battery devices interconnected in series and carried on an electric car or a hybrid car and thereby equalizing each voltage across each of the battery devices interconnected in series.

2. Description of the Related Art

The related art in this field is disclosed, for example, in Japanese Laid-Open Patent Publication No. Hei 11-176483 and U.S. Pat. No. 5,003,244. In the configuration of the former patent as shown in FIG. 7, the output voltages E1 to En of a plurality of battery devices 1-1 to 1-n are interconnected in series. For the purpose of the balance correction of the output voltages of the battery devices, a switching transistor 2 connected to a primary coil Np in series is turned ON and OFF in response to the output voltages. A converter is composed of a plurality of secondary coils Ns each corresponding to each of the battery devices and wound on a common transformer core with the primary coil. The connection thereof is configured such that the secondary output of the converter charges each battery device. When the switching transistor 2 is periodically turned ON and OFF, a voltage depending on the turn number ratio is generated in each secondary coil Ns. Since the secondary coils are wound on the common core, the induced charging current concentrates in a battery device having the lowest voltage among the battery devices, whereby the battery devices are equalized in voltage. In this former circuit, in addition to that the switching transistor is simply turned ON and OFF, the current Ip flowing in the primary coil Np is controlled depending on the load current Io.

Further, in the configuration of the latter patent as shown in FIG. 8, the output voltages of a plurality of battery devices 25, 26, 27, 28 are connected in series. For the purpose of the balance correction of the output voltages of the battery devices, a switching transistor 34 connected to a primary coil 16 in series is turned ON and OFF in response to the input from a power supply 30. A converter 14 is composed of a plurality of secondary coils 21, 22, 23, 24 each corresponding to each of the battery devices and wound on a transformer core 18 common to the primary coil 16. The connection thereof is configured such that the secondary output of the converter 14 charges each battery device. When the switching transistor 34 is periodically turned ON and OFF, a voltage depending on the turn number ratio is generated in each secondary coil. Since the secondary coils are wound on the common core, the induced charging current concentrates in a battery device having the lowest voltage among the battery devices, whereby the battery devices are equalized in voltage.

There has been the following problems in such above-mentioned related art apparatuses for equalizing the voltages across each of a plurality of energy storage device (battery devices) interconnected in series by means of the switching of a converter.

(a) In each above-mentioned related art apparatus, the magnetizing force is one directional in the transformer core for the ON and OFF duration of the switching device (transistor). Accordingly, the range of the change in magnetic flux density of the core is small, and hence the utilization of the core is less efficient. The lower efficiency in core utilization implies the necessity of a larger cross section in the core for a specific output power, thereby causing the problems of a larger apparatus and a higher cost. Further, the switching ON and OFF of the switching device for the voltage equalizing causes a problem that electric charge stored in the capacitance existing between the terminals of the switching device for the OFF duration of the switching device is discharged by the next ON operation thereby to cause a power loss and a noise due to the short-circuit current.

(b) In each above-mentioned related art apparatus, energy stored in the transformer for the ON duration of the switching device is discharged for the next OFF duration of the switching device, thereby charging a battery device having the lowest voltage among the battery devices thereby to equalize the output voltages of the battery devices. Accordingly, the amount of equalizing energy is only the amount of energy stored for the ON duration of the switching device. Therefore, in order to increase the equalizing action, a larger switching device is necessary for increasing the equalizing current. However, this larger switching device causes a larger apparatus and hence a higher cost, as is the above-mentioned case (a). Further, since each battery device has an internal resistance, the higher current from the switching device causes a larger voltage drop across the internal resistance, thereby increasing apparent output voltage of the battery device in charging. This causes a problem of reducing the precision of output voltage equalizing.

In addition to resolving the above-mentioned problems, earnestly desired are short-time equalization of the output voltages of the battery devices, reduction of energy loss after the equalization operation, and setting of the voltage at an arbitrary value after the equalization.

SUMMARY OF THE INVENTION

An object of the present invention is to resolve the above-mentioned problems (a) and (b) thereby to provide a voltage equalizing apparatus having a high efficiency and a high precision of equalizing and being of a small size. Further, an object of the present invention is to provide a voltage equalizing apparatus capable of equalizing to a desired voltage in a short time, reducing the energy loss after the completion of equalization, and setting the voltage after the equalization to be an arbitrary value.

An aspect of the invention for resolving the above-mentioned problems is a voltage equalizing apparatus for battery devices comprising:

a core;

a plurality of first battery devices interconnected in series, each consisting of one or more cells;

a plurality of secondary windings magnetically connected with each other through the core;

a plurality of a first switching devices composed of a first closed circuit by mutually connecting one of the plurality of secondary windings and the one of a plurality of first battery device;

one or more second battery devices provided separately from said plurality of first battery devices interconnected in series or a second battery device provided by rendering the whole of said plurality of first battery devices interconnected in series one battery device;

a primary winding magnetically connected with a plurality of the secondary windings through the core; and a second switching device composed of a second closed circuit by interconnected in series between the second battery device and the primary winding;

wherein the plurality of first switching devices and the second switching device are alternately turned ON and OFF to equalize the output voltages of the plurality of first battery devices;

when the second switching device is turned ON, exciting energy stored in the core is transported by the charging to the battery devices having lower voltages among said plurality of first battery devices, even after the transportation of said excitation energy is completed, said first switching devices continue to be turned ON, to effect the charging from the battery devices having higher voltages among said plurality of first battery devices to the battery devices having lower voltages among said plurality of first battery devices and/or to store energy in said core.

BRIEF DESCRIPTION OF THE DRAWINGS

FIGS. 10A($a$) to 10($d$) are timing charts in the situation in which the first battery devices B2 to Bn have been equalized.

DETAILED DESCRIPTION OF THE PREFERRED EMBODIMENTS

The present invention will be described in detail with reference to the accompanying drawings.

First Embodiment

A first embodiment of the present invention is described below with reference to FIG. 1.

Figure 1:
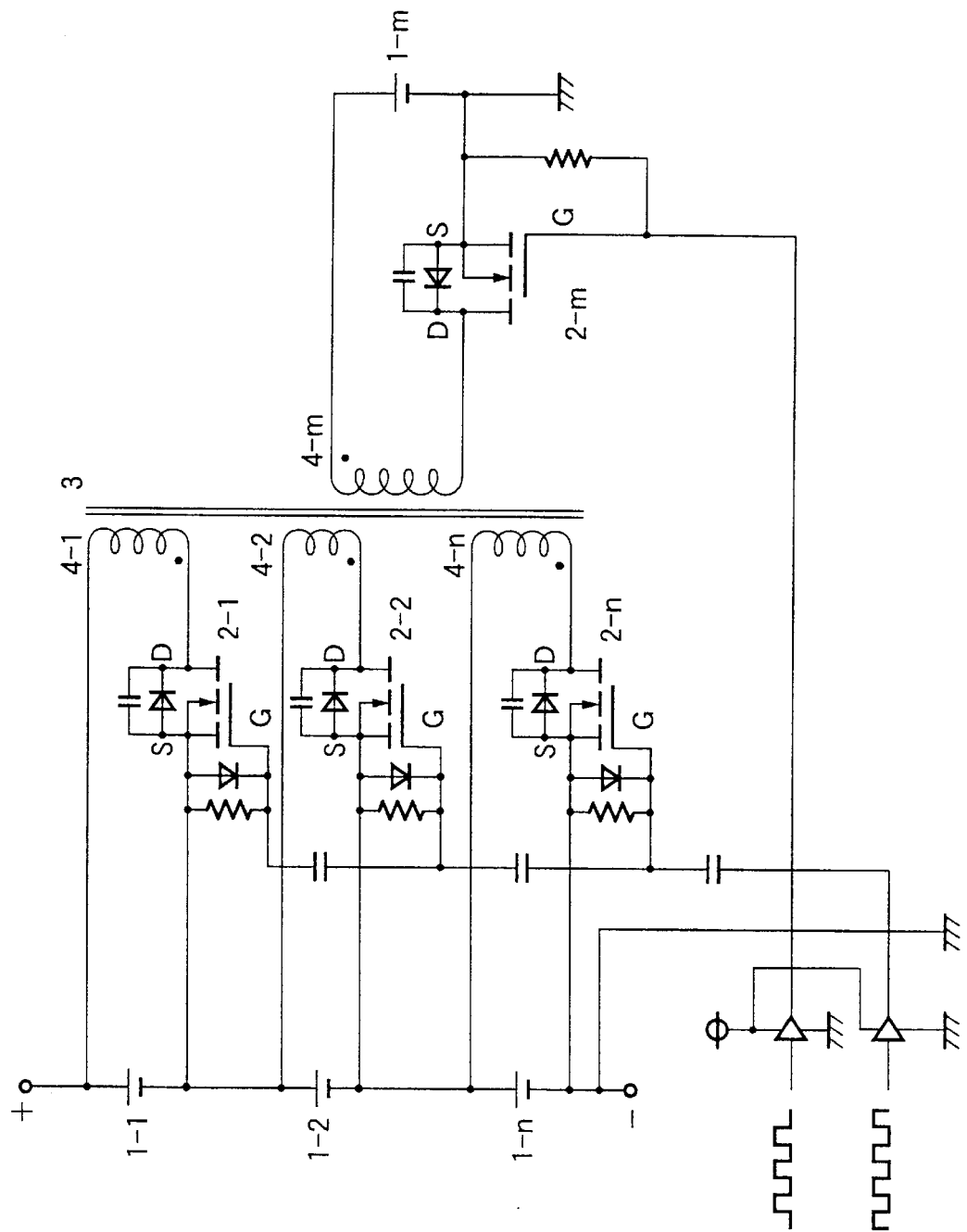
FIG. 1 is a diagram showing a voltage equalizing apparatus for battery devices in accordance with a first embodiment of the invention.

FIG. 1 shows a basic circuit of the present invention. Numerals 1-1 to 1-n designate a plurality of first battery devices interconnected in series. Numerals 2-1 to 2-n designates a plurality of first switching devices. Numeral 1-m is a second battery device provided separately from the plurality of battery devices. Numeral 2-m is a second switching device for conducting a current from the battery device 1-m to a primary winding 4-m wound on a common core of a transformer 3. The common core of the transformer 3 is further provided with a plurality of secondary windings 4-1 to 4-n for providing charging currents into the battery devices 1-1 to 1-n interconnected in series. In this case, the secondary windings 4-1 to 4-n have the same winding number.

Figure 13:
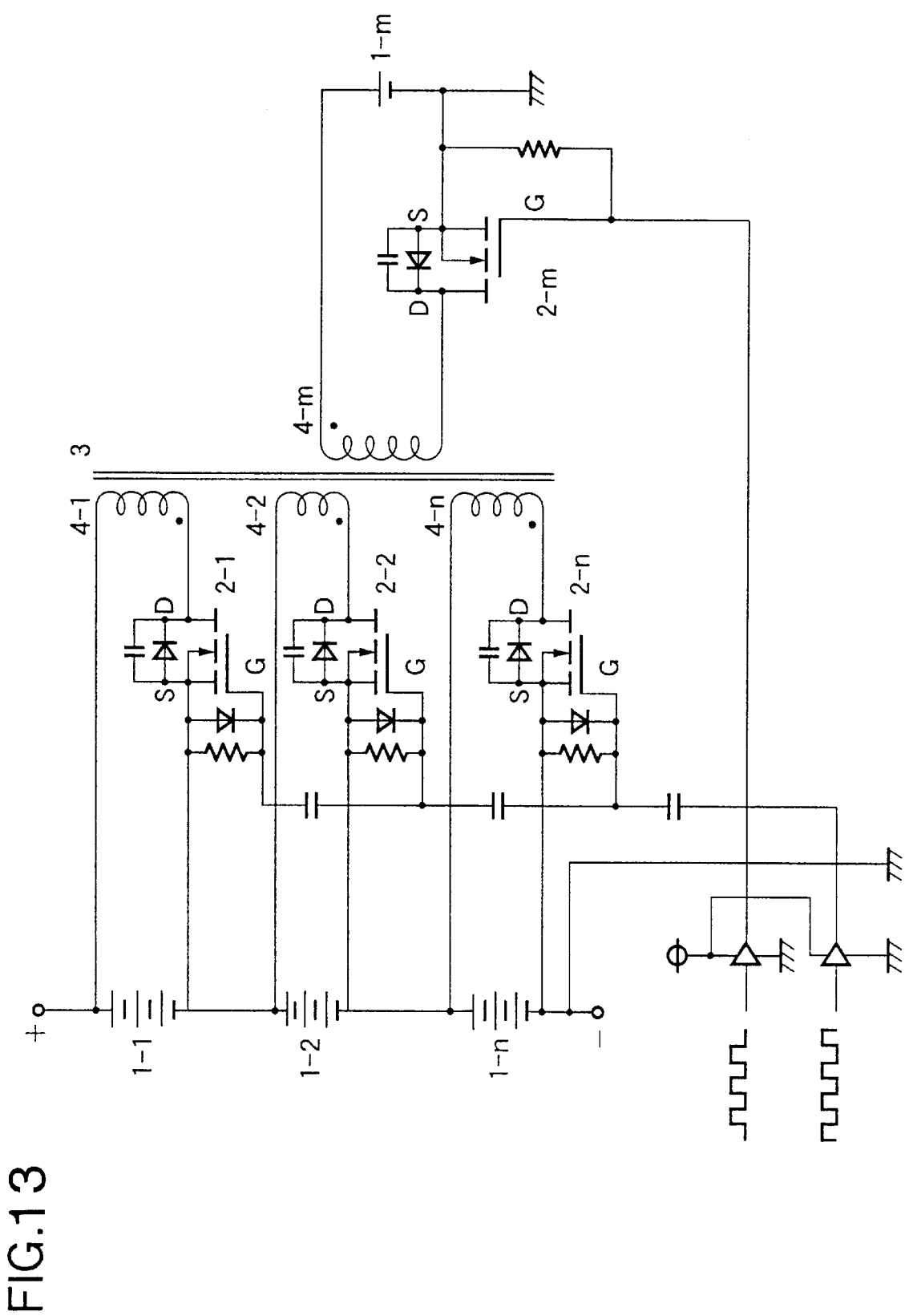
FIG. 13 is a diagram showing a first modification of the voltage equalizing apparatus for battery devices in accordance with the first embodiment of the invention.
Figure 14:
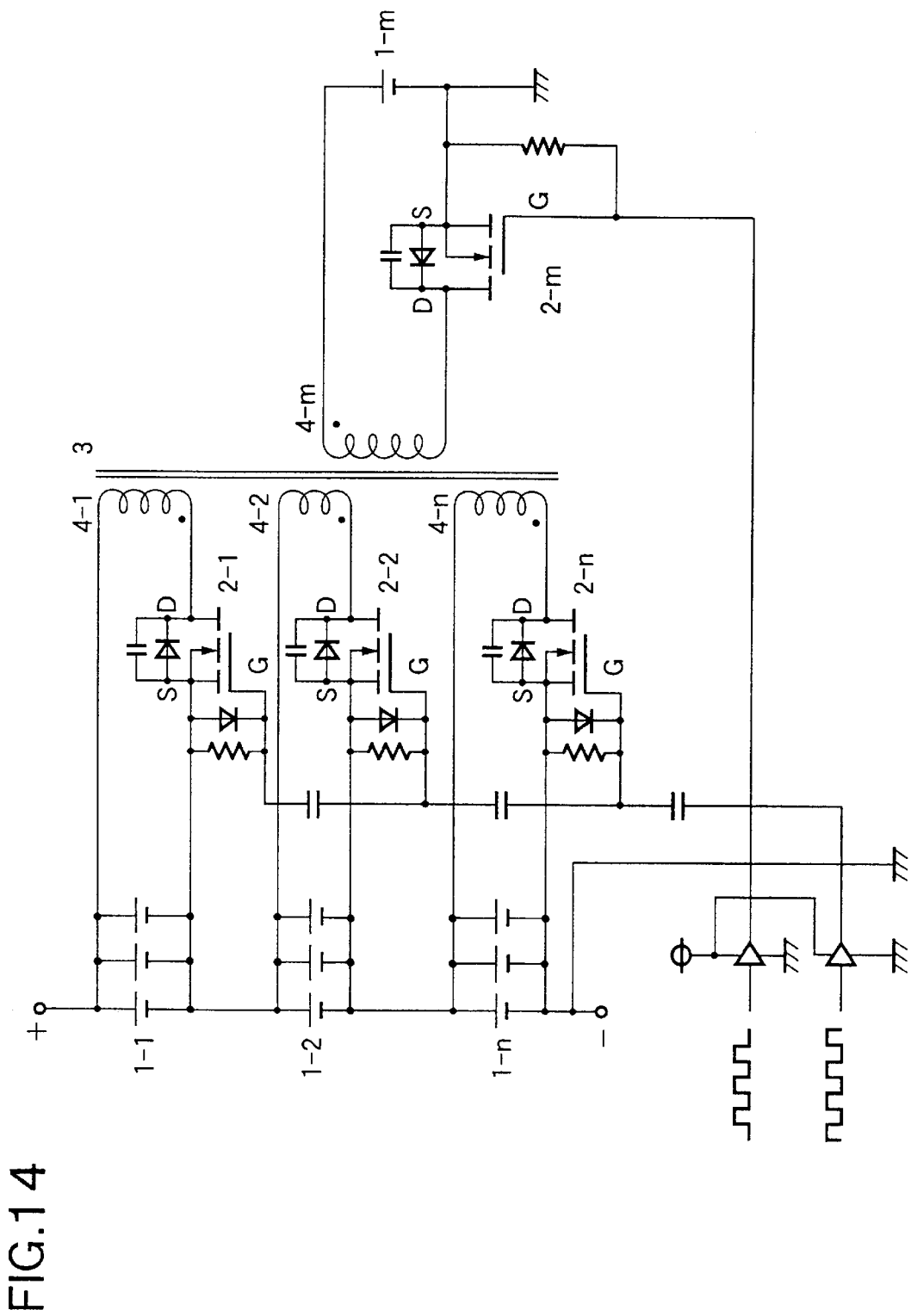
FIG. 14 is a diagram showing a second modification of the voltage equalizing apparatus for battery devices in accordance with the first embodiment of the invention.

As to the first battery devices 1-1 to 1-n, it is acceptable not only that each of them is one cell constituted as shown in FIG. 1 but also that each of them is constituted by connecting a plurality of cells. The plurality of cells of one battery device may be interconnected in series as shown in FIG. 13 or may be connected in parallel as shown in FIG. 14. Furthermore, it is also possible to interconnect a plurality of cells which are connected in parallel and another plurality of cells which are connected in parallel in series, thereby to provide one battery device.

Figure 15:
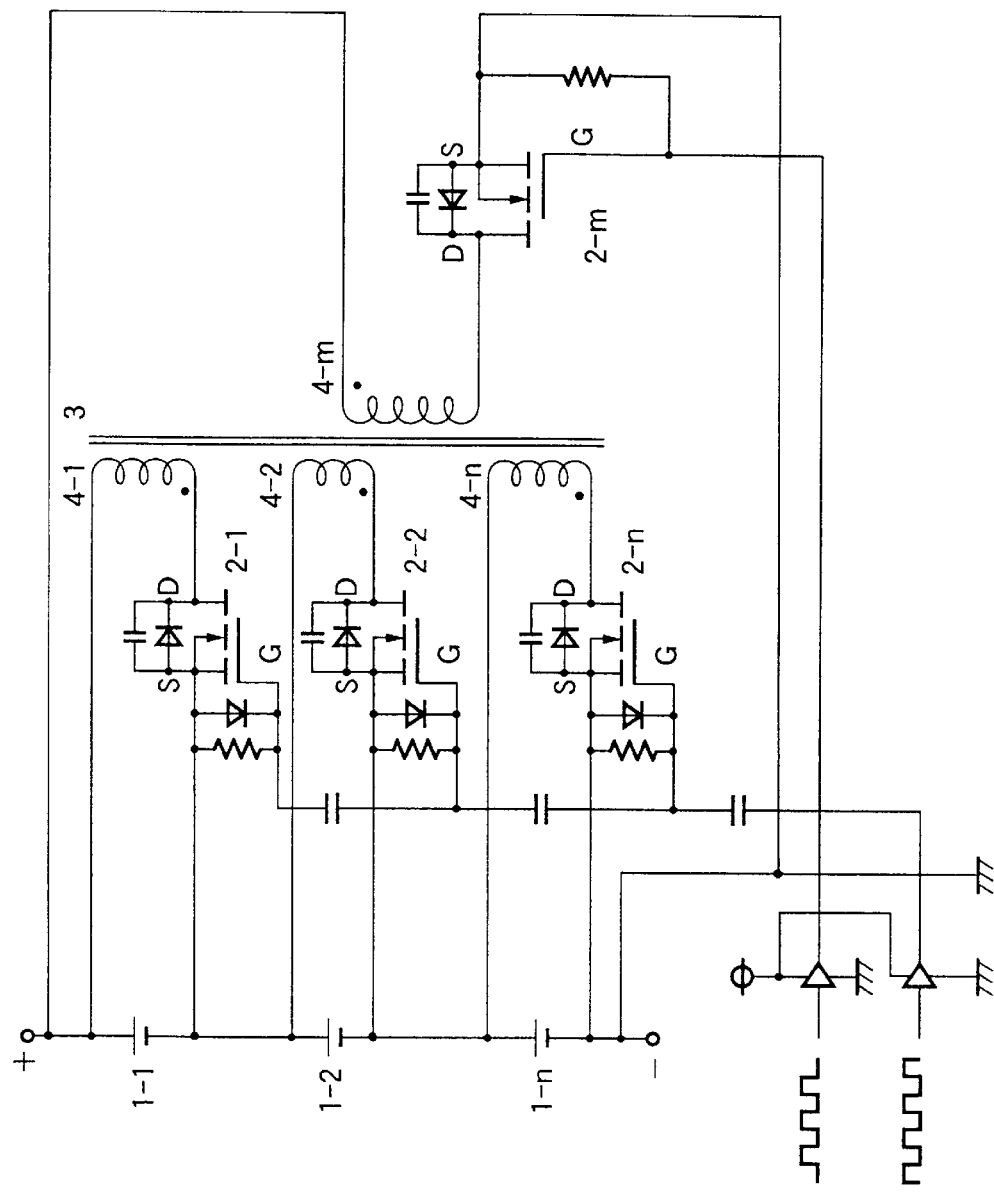
FIG. 15 is a diagram showing a third modification of the voltage equalizing apparatus for battery devices in accordance with the first embodiment of the invention.

The second battery device 1-m may be in combination with a direct-current power supply, a charger, or a generator, also may be a capacitor, for example, a film capacitor or an electric double-layered capacitor. Meanwhile, although the second battery device 1-m is provided separately from the first battery devices 1-1 to 1-n interconnected in series in FIG. 1, the first battery devices 1-1 to 1-n interconnected in series may be used as a whole also as the second battery device 1-m. That is to say, it is noted in FIG. 15 that the first battery devices 1-1 to 1-n interconnected in series are treated as a whole as one battery device, from which exciting current flows to the primary winding 4-m of the transformer 3 via the second switching device 2-m.

The switching device 2-m and the switching devices 2-1 to 2-n are provided with pulses in opposite polarity as shown in the figure. Accordingly, the conduction thereof is controlled such that the switching devices 2-1 to 2-n are OFF when the switching device 2-m is ON and that the switching devices 2-1 to 2-n are ON when the switching device 2-m is OFF.

Figure 2:
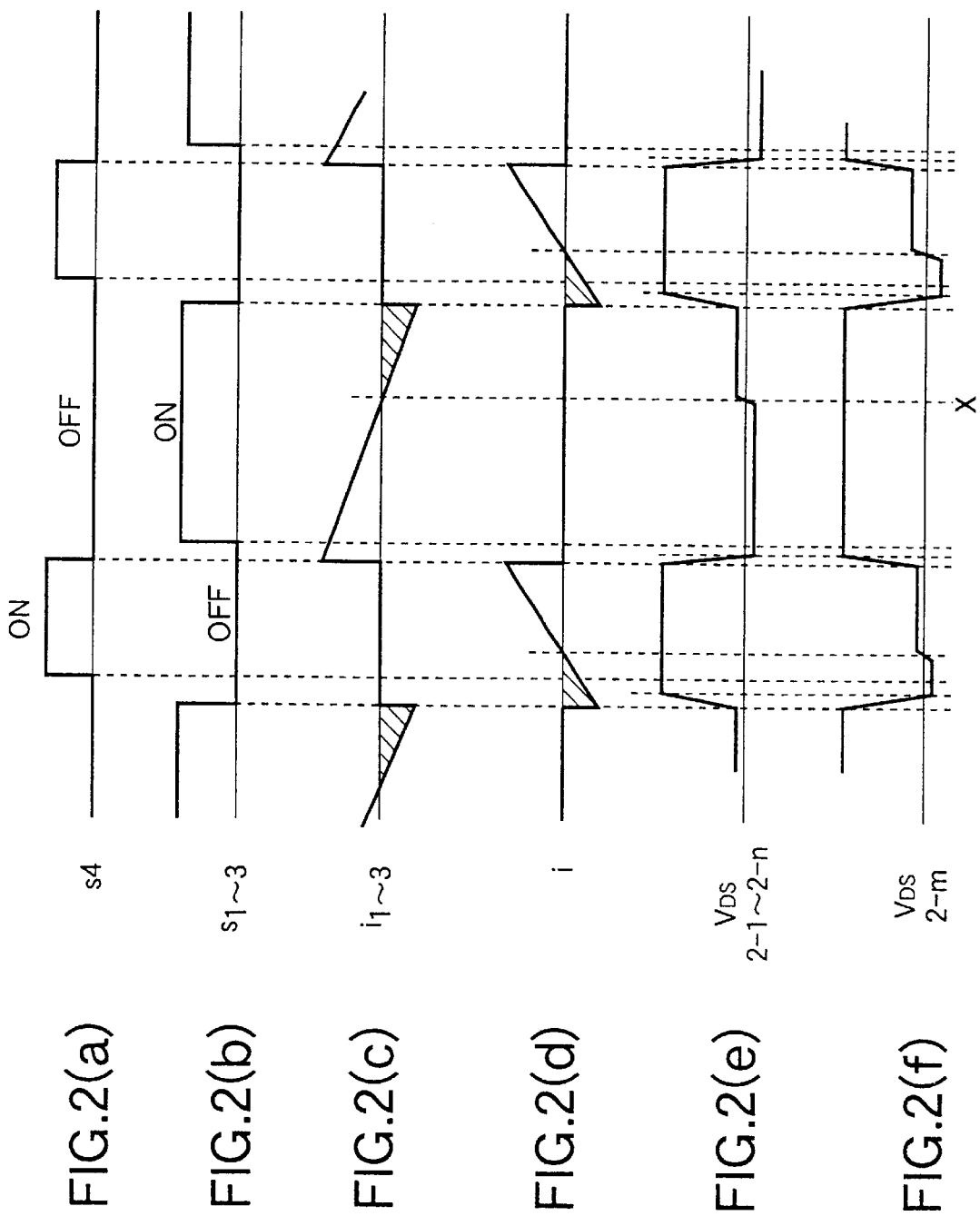
FIG. 2 is a diagram showing the operation of the voltage equalizing apparatus for battery devices in accordance with the first embodiment of the invention.

Next, the operation of the circuit shown in FIG. 1 is described below with reference to FIG. 2. In principle, the circuits of FIGS. 13–15 have the same operation. So, an explanation will be provided hereinafter representatively with respect to the circuit of FIG. 1.

FIG. 2(a) shows the ON and OFF duration of the second switching device 2-m. FIG. 2(b) shows the ON and OFF duration of the first switching devices 2-1 to 2-n. FIG. 2(c) shows charging and discharging currents for the voltage equalizing of the battery devices 1-1 to 1-n. These currents flow through the secondary windings 4-1 to 4-n. (These currents are different from a charging current from an external charger and a discharging current to an external load supplied to and from the battery devices interconnected in series.) FIG. 2(d) shows a current flowing through the primary winding 4-m. This current supplies equalizing energy stored in the transformer 3.

As described above, the ON operation of the first switching devices is continued until a time after the completion of release of exciting energy stored in the transformer by an ON operation of the second switching device, into the first battery devices through the first switching devices.

Figure 6:
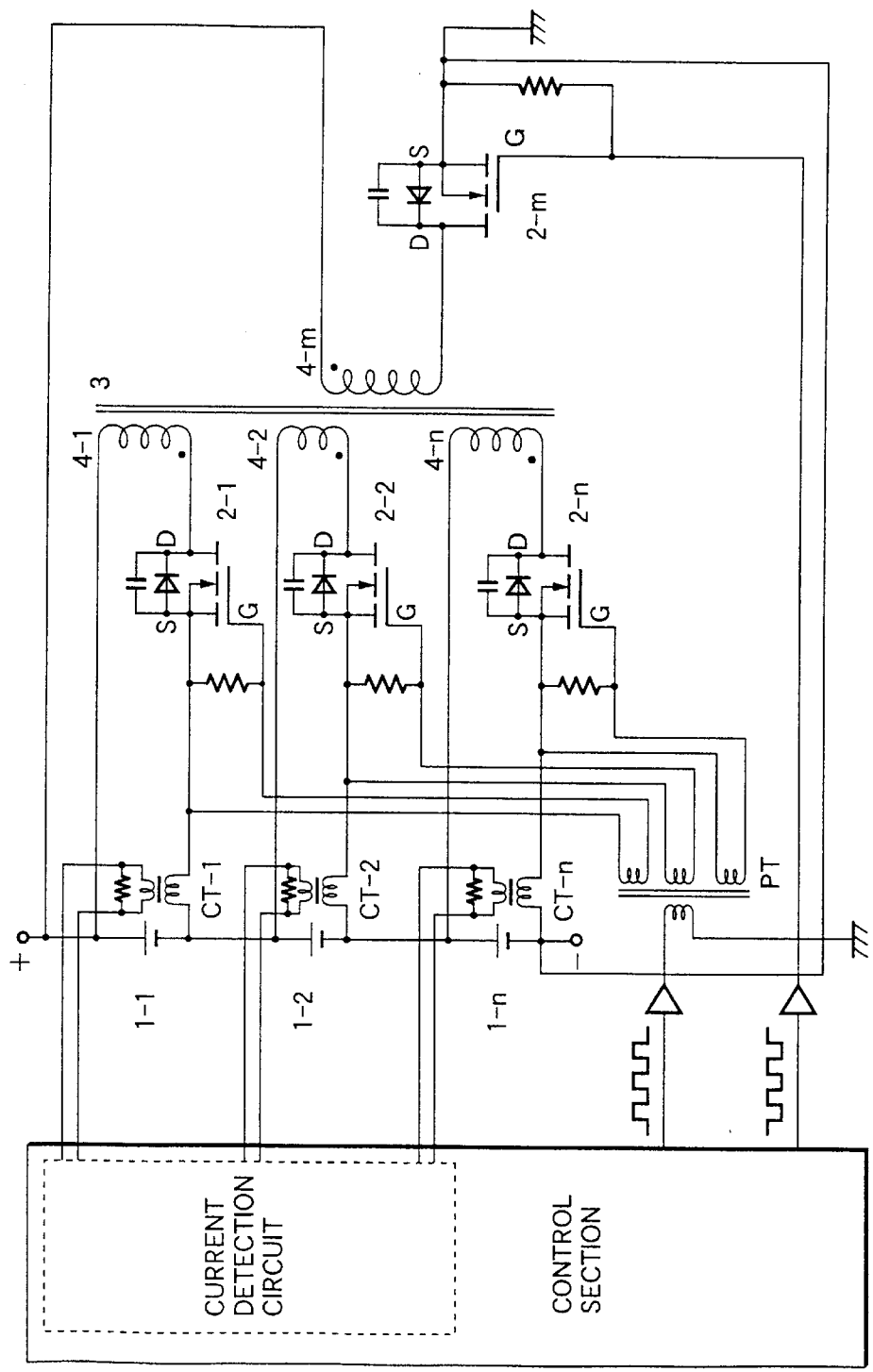
FIG. 6 is a diagram showing a circuit for detecting the timing of completion of the release of the exciting energy of a transformer.

In order to detect the completion of release of exciting energy stored in the transformer by an ON operation of the second switching device into the first battery devices through the first switching devices, a current transformer CT-1 to CT-n as a current detector is provided in each closed circuit constituted of each secondary winding 4-1 to 4-n, each battery device 1-1 to 1-n, and each switching device 2-1 to 2-n, as shown in FIG. 6. Then, by detecting the timing of the polarity inversion of the output of each transformer, the timing of the completion of the release of exciting energy in the transformer 3 can be detected. Here, a resistor may be used instead of each current transformer shown herein. Further, a pulse transformer PT may be used for driving the switching devices 2-1 to 2-n, as shown in FIG. 6.

Furthermore, the timing of the completion of the release of exciting energy in the transformer 3 can be detected by an operation on the terminal voltage of the first battery devices, exciting energy in the transformer, or the like.

Described below is a discussion that the voltage equalizing among the battery devices can be realized without an increase in apparatus size.

A current from the battery device 1-m flows into the winding 4-m for the ON duration of the second switching device 2-m, whereby an amount of energy is stored in the transformer 3 by a current portion not shaded in FIG. 2(d). FIG. 2(f) shows the change in the voltage Vds across the switching device 2-m before and after the ON transition of the switching device 2-m. When the switching devices 2-1 to 2-n go OFF, the electric charge stored in a capacitance component (parasitic capacitance and an external capacitor) across the switching device 2-m is discharged through a parasitic diode involved in the switching device 2-m, whereby the voltage Vds across the switching device 2-m falls to about zero (approximately equal to the normal direction voltage of the diode) for the pause duration until the ON transition of the switching device 2-m. When the ON state of the switching devices 2-1 to 2-n is continued after the release of exciting energy in the transformer, the direction of the current flowing each closed circuit becomes reversed, and a current begins to flow, in turn, from each switching device 2-1 to 2-n to each winding 4-1 to 4-n (shaded part in FIG. 2(c)). The reversed current excites the transformer, and transfers energy from a battery device having a higher terminal voltage to a battery device having a lower terminal voltage. At that time, the voltage across each switching device 2-1 to 2-n changes as shown in FIG. 2(e). When the switching devices (FET's) 2-1 to 2-n go OFF, the exciting energy stored by a portion of the reversed current is released to the primary winding. This released current draws the electric charge stored in the capacitance component (including an external capacitor) across the Vds of the switching device (FET) 2-m. After that, the Vds is clamped to the normal direction voltage (about 0.5 V) for the duration when a normal direction current flows in the parasitic diode of the FET. Therefore, for the almost entire duration shown by a shadow in the waveform shown in FIG. 2(d), a current is flowing in the parasitic diode. Accordingly, if the switching device 2-m is turned ON within the duration, the Vds is almost zero, and hence zero-volt switching can be achieved. The zero-volt switching reduces the switching power loss and the noise at switching ON. The description above has been made for the switching device 2-m. However, the situation is similar also for the switching devices 2-1 to 2-n (FIG. 2(e)).

Then, the switching device 2-m goes OFF and the switching devices 2-1 to 2-n go ON. In this situation, each battery device 1-1 to 1-n is ready for charge by the voltage across each winding 4-1 to 4-n induced by the energy stored in the transformer 3 for the ON duration of the switching device 2-m. However, every battery device 1-1 to 1-n is not equally charged by the induced voltage across each winding 4-1 to 4-n.

Figure 7:
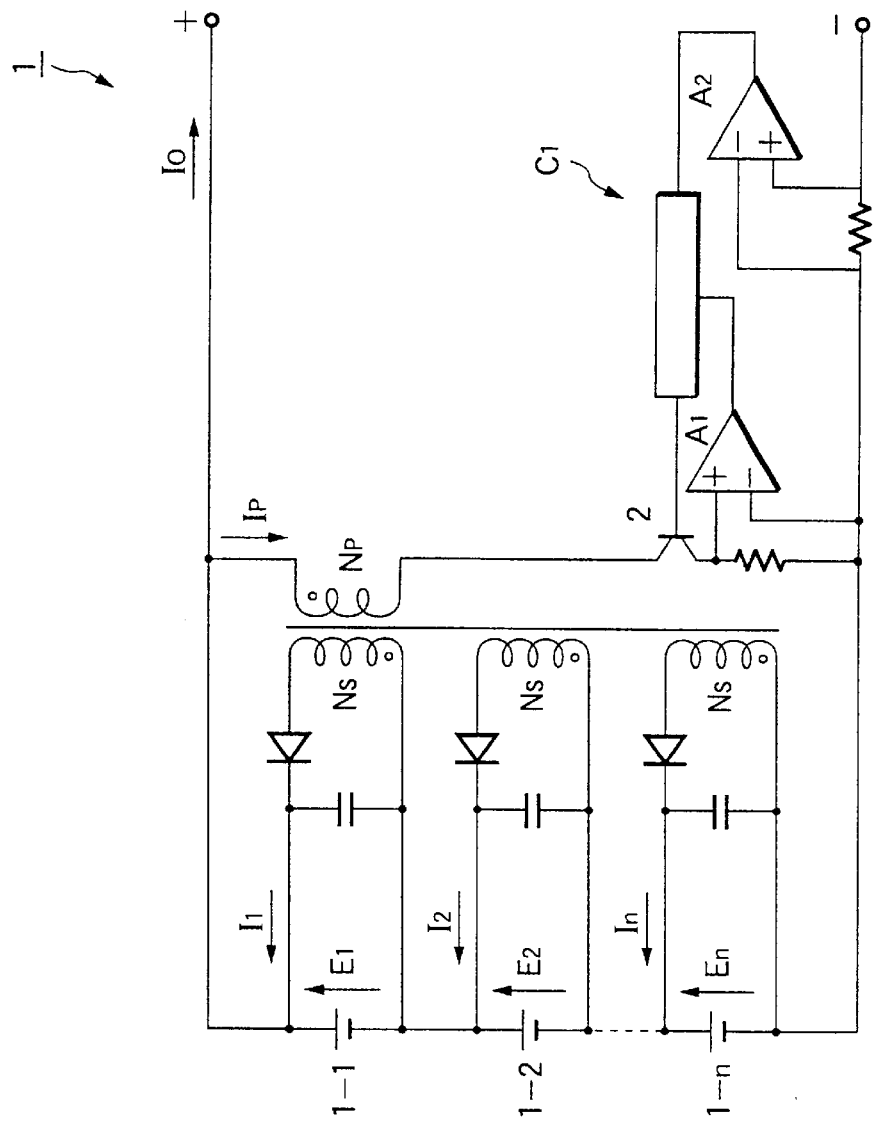
FIG. 7 is a diagram showing a voltage equalizing apparatus for battery devices in accordance with a first related art.
Figure 8:
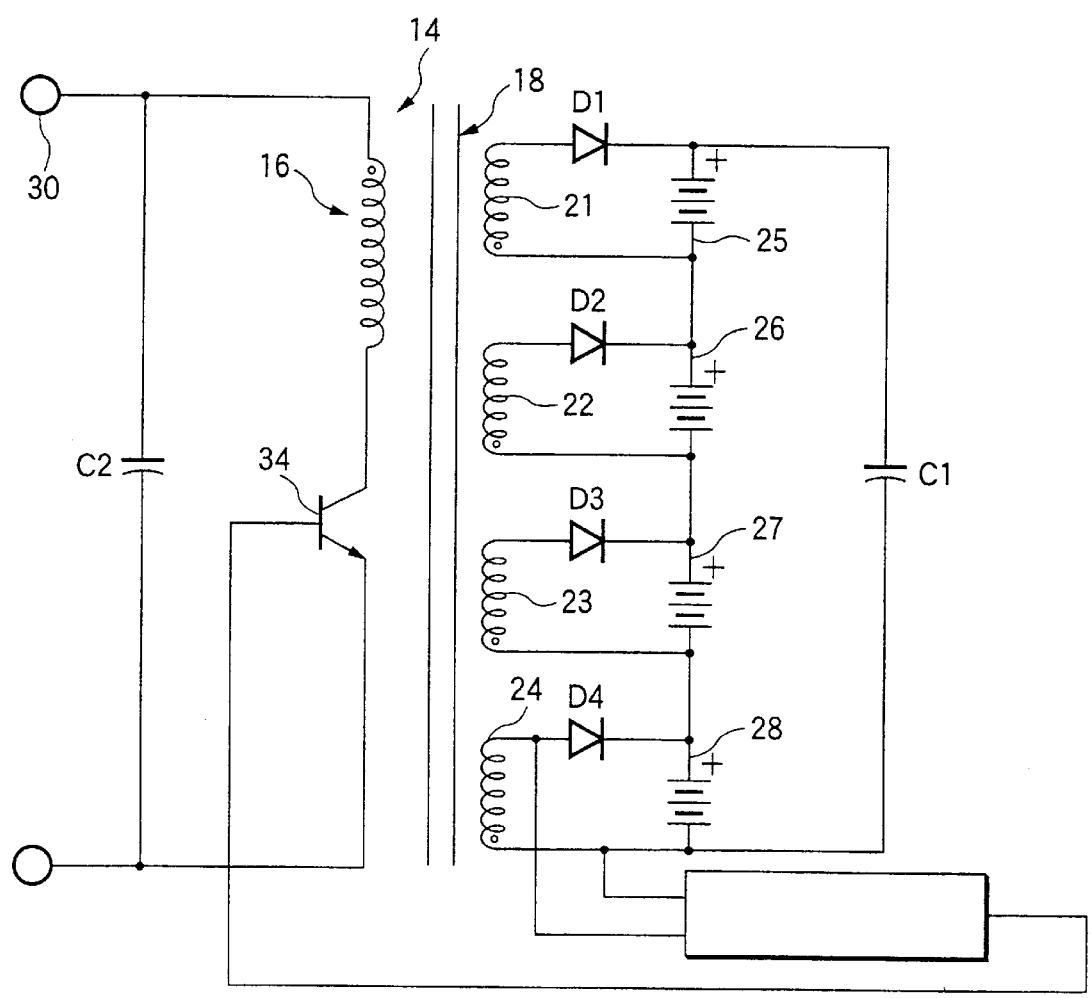
FIG. 8 is a diagram showing a voltage equalizing apparatus for battery devices in accordance with a second related art.

When there is a variation in the output voltages of the battery devices 1-1 to 1-n interconnected in series, the current of the portion not shadowed in FIG. 2(c) concentrates in a battery device having the lowest voltage among the battery devices interconnected in series. This charging current increases the voltage of the battery device having the lowest voltage among the battery devices interconnected in series. Such an operation is repeated, thereby equalizing the voltages of the battery devices interconnected in series. (The situation is the same as that of the voltage equalizing operation by the related art circuits shown in FIGS. 7 and 8.)

As described above, in the present invention, even after the concentrated release of the energy stored in the transformer 3 for the ON duration of the switching device 2-m into the battery device having the lowest voltage (after the timing indicated by a broken line X in FIG. 2), the switching devices 2-1 to 2-n remain ON. If there is a variation in the output voltages of the battery devices 1-1 to 1-n interconnected in series still at the timing X of the concentrated release of the energy stored in the transformer 3 for the ON duration of the switching device 2-m into the battery device having the lowest voltage, discharging occurs from a battery device having the highest voltage among the battery devices interconnected in series. This is because the switching devices 2-1 to 2-n are ON. The discharging current is indicated by shadow portion in FIG. 2(c).

As such, energy stored in the transformer 3 by the current indicated by shadow portion in FIG. 2(c) from a battery device having the highest voltage among the battery devices interconnected in series. Further, energy is transferred from a battery device having the highest voltage to a battery device having the lowest voltage. The energy stored in the transformer 3 is released as a charging current (shadow portion in FIG. 2(d)) flowing into the battery device 1-m after the switching devices 2-1 to 2-n go OFF. (For this duration, the switching device 2-m does not go ON yet. However, the switching device 2-m is provided with a diode connected in the direction permitting the battery device 1-m. Thus, charging is possible.)

Figure 3:
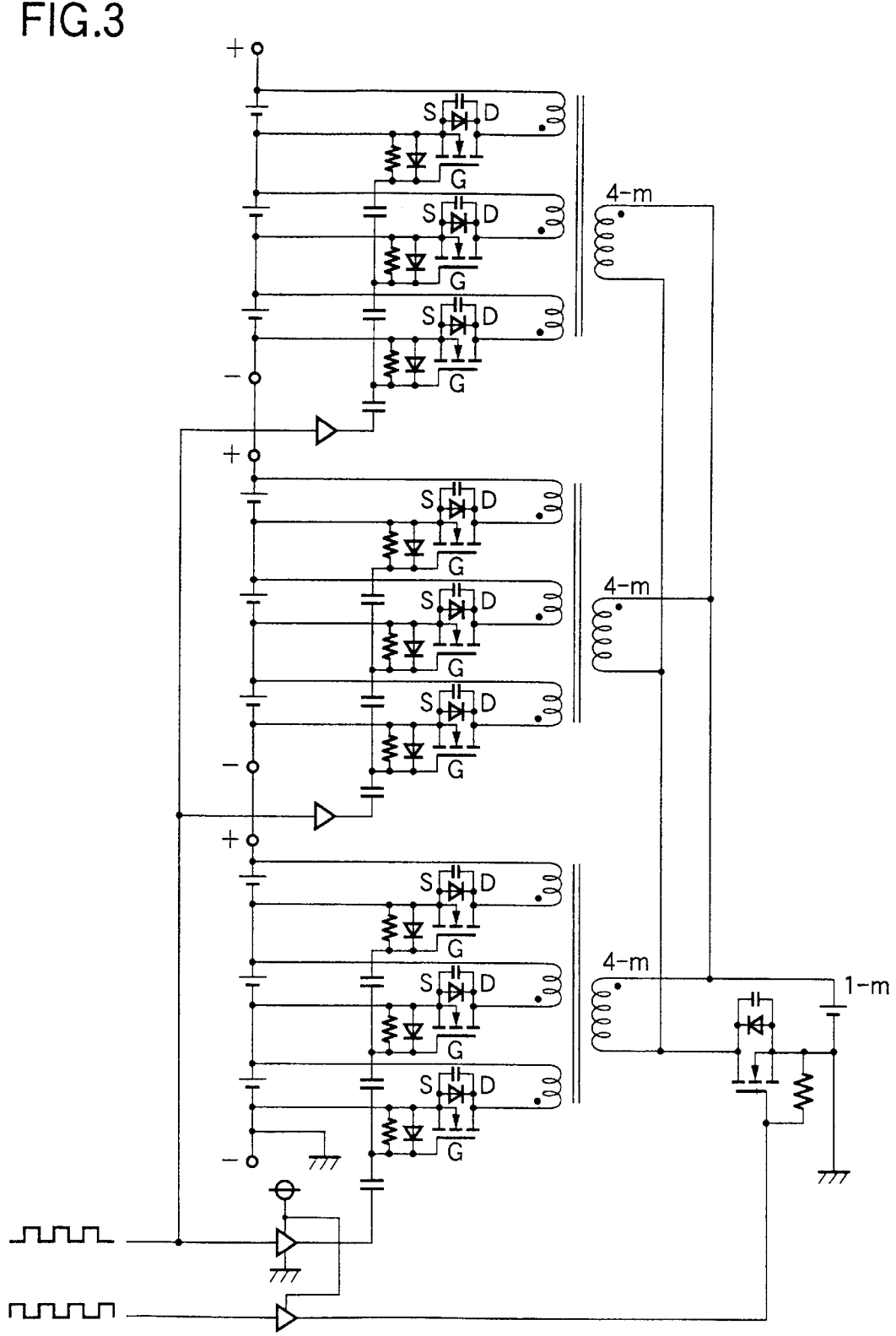
FIG. 3 is a diagram showing a voltage equalizing apparatus for battery devices in accordance with a second embodiment of the invention.

When an FET is used for the switching device as shown in FIGS. 1 and 3, the parasitic diode is generated by a fabrication process. Energy is transported through the windings 4-1 to 4-n, and thereby stored in the transformer 3. When the switching devices 2-1 to 2-n go OFF, the energy is discharged and released from the transformer 3 so as to change the second battery device 1-m.

The voltage equalizing operation by the transportation of the energy stored in the core (the charging to the plurality of battery devices by the voltage induced in the secondary winding of the transformer 3) and the voltage equalizing operation by the transfer of energy between the battery devices (the discharging from the battery devices having higher voltages among the plurality of battery devices to the battery devices having lower voltages) may proceed in parallel and simultaneously or may proceed independently if seen from the plurality of battery devices interconnected in series as a whole. Whether the former operation prevails or the latter operation prevails depends on the relationship between the voltage which occurs in the secondary winding of the transformer 3 and the voltages of the battery devices.

The voltage of the secondary winding of the transformer 3 when the first switching devices 2-1 to 2-n have been turned ON varies from an initial voltage, which is the averaged one of the total of respective voltages of the plurality of battery devices 1-1 to 1-n interconnected in series but having a voltage by the transportation of energy from the transformer 3 added thereto, to a final voltage having a voltage by the storing of energy in the transformer 3 subtracted. As a result, the battery devices having higher voltages transfer from the charged state by the transportation of energy stored in the core to the discharged state by the transfer of energy to the battery devices having lower voltages earlier than the battery devices having lower voltages.

Figure 16:
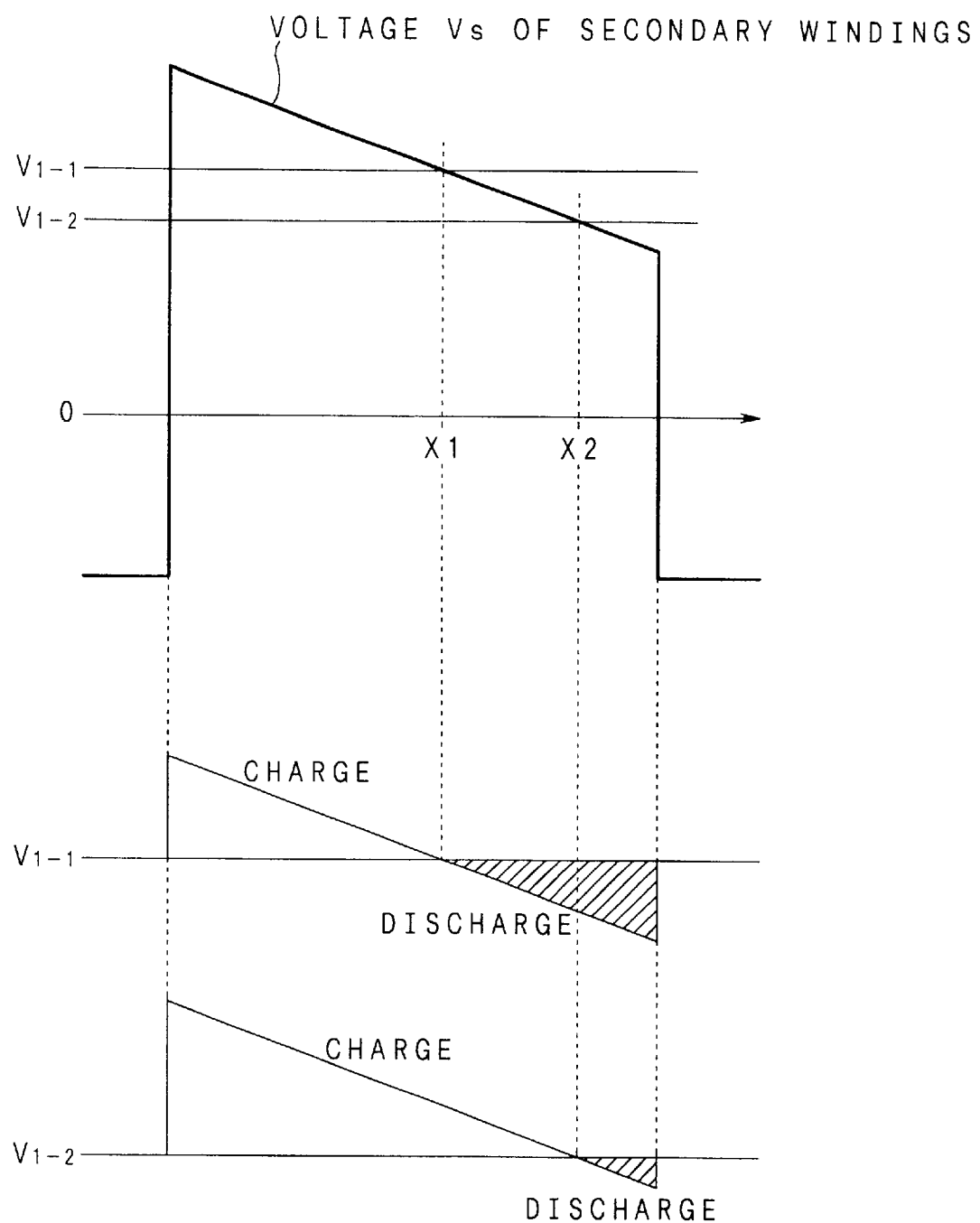
FIG. 16 is a diagram explaining a voltage equalizing operation of the voltage equalizing apparatus.

With reference to FIG. 16, the voltage equalizing operation as mentioned above will be explained. For example, if the voltages V1-1 and V1-2 of two battery devices are in such a relationship that V1-1>V1-2, and the voltage Vs of the secondary winding of the transformer 3 is higher than the voltages V1-1 and V1-2 of the battery devices, the charging is effected such as to be concentrated to the battery devices having lower voltages while respective battery devices are charged. Then, accompanying the transportation of energy from the secondary winding of the transformer 3, if the winding voltage Vs becomes lowered from the initial voltage to be the voltage V1-1 (at the time X1), the charging by the transportation of energy from the secondary winding ceases in the battery device of the voltage V1-1. And in the battery device of the voltage V1-2, the charging starts by the current discharged via the secondary winding from the battery device of the voltage V1-1, in addition to the charging by the transportation of energy from the secondary winding. After that, if the winding voltage becomes further lowered so that Vs=V1-2 (at the time X2), the charging to the battery device of the voltage V1-2 ends and the storing of energy in the core starts.

Thus, in a state that the voltages of the plurality of battery devices interconnected in series are dispersed, it comes about that the voltage equalizing operation by the transportation of energy stored in the core and the voltage equalizing operation by the transfer of energy between the battery devices become complex such that both of them exist as mixed at the same time or only one of them exists. By such complex operations, the apparatus is controlled so that the charging is effected to the battery devices having lower output voltages, and the discharging is effected to the battery devices having higher output voltages.

Figure 17:
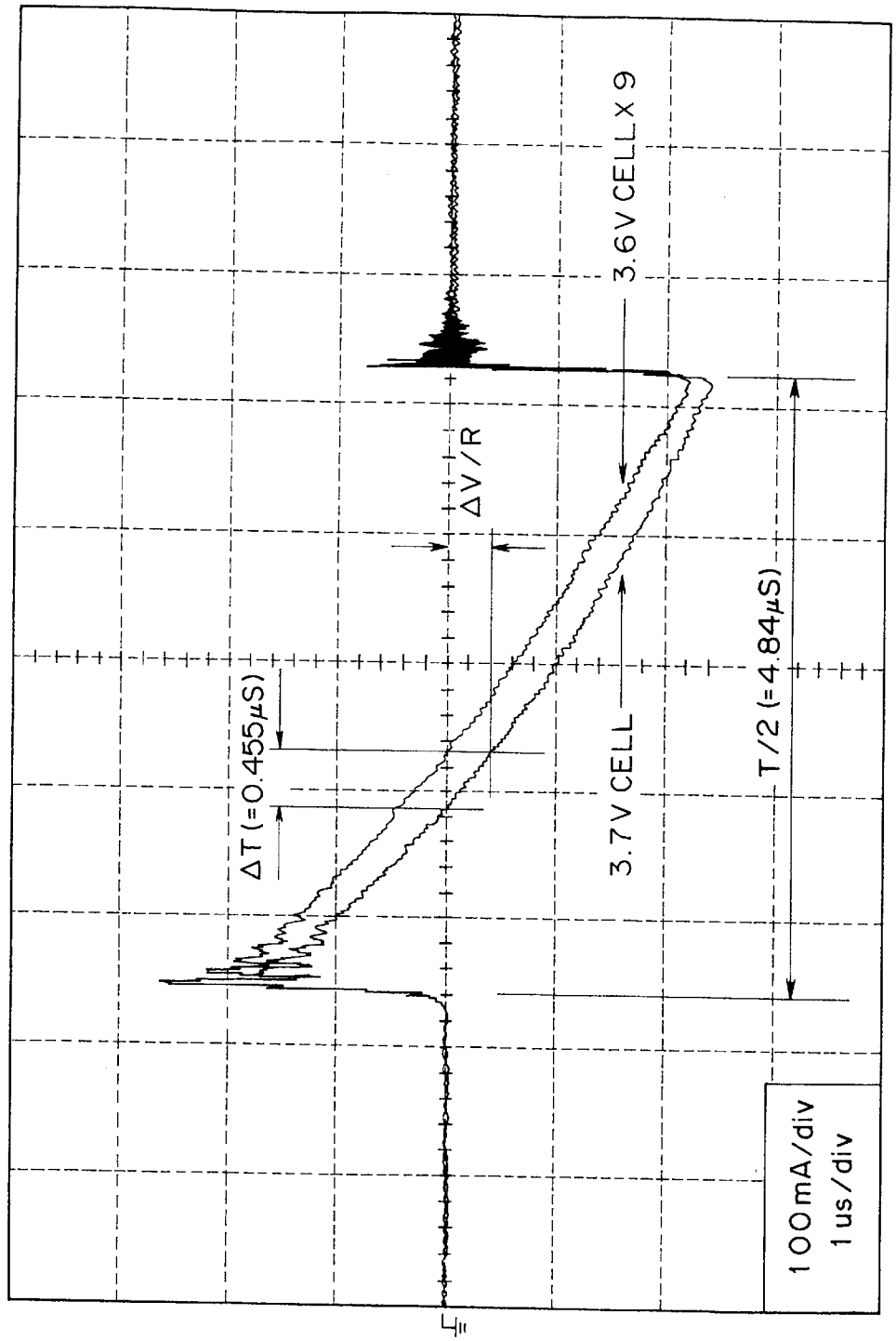
FIG. 17 is a waveform diagram when electric current in a secondary winding of a transformer is measured.

The effects of voltage equalizing for the plurality of battery devices can be evaluated by the values of the charging/discharging currents having a difference voltage $\Delta V$ between the maximum voltage and the minimum voltage of the battery devices divided by the equivalent resistance R of the closed circuit, in other words, the capability to compress the difference voltage between the maximum voltage and the minimum voltage. FIG. 17 shows an example of the waveforms of current of the secondary winding measured in the equalizing operation under the condition that the number of the battery devices interconnected in series n=10 cells, the difference voltage $\Delta V=0.1V$ (the voltages of nine cells are 3.6 V, and the voltage of the remaining one cell is 3.7V), and the equivalent resistance R of the closed circuit=3.3 $\Omega$. In this example, in case the ratio X of the equalizing capability by the transfer of energy between the battery devices to the whole voltage equalizing capability is measured based on the ratio of the equalizing operation period $\Delta T$ by the current between the battery devices via the secondary winding to the equalizing operation period T/2 (duty ratio 50% of ON/OFF of the switching device), a result that X=4.7% has been obtained.

Such equalizing operation can perform equalization to an extent (for example, 20 mV), however, the variation is not improved further. This is because a high current is supplied (the ON duration of the second switching device and/or the first switching devices is long) in each closed circuit in order to achieve the voltage equalizing as rapid as possible in the initial state having a large unbalance. When such a high current flows through a line resistance, the ON resistance of an FET, the resistance in a transformer winding, and the like, a voltage drop occurs and is added to the terminal voltage of each switching device. This added voltage appears across each secondary winding. Therefore, if an added voltage coincides with another added voltage, the equalizing does not proceed between these battery devices even when there is an actual voltage difference.

That is, the equalizing of the terminal voltages of the battery devices is obstructed by the "difference in generated voltage" due to a variation in line resistance, ON resistance of an FET, internal resistance in battery devices, and the like existing in each closed circuit of each secondary winding.

A method for resolving this problem is to reduce the circuit current during the equalizing, thereby reducing the "difference in generated voltage". As one method thereof, there is a method to shorten the ON duration of the second switching device and/or the first switching devices. In accordance with this method of shortening the ON duration of the second switching device and/or the first switching devices thereby to reduce the equalizing currents when the variation becomes somewhat small is effective for improving the precision of the equalizing of the terminal voltages of the battery devices.

Figure 18:
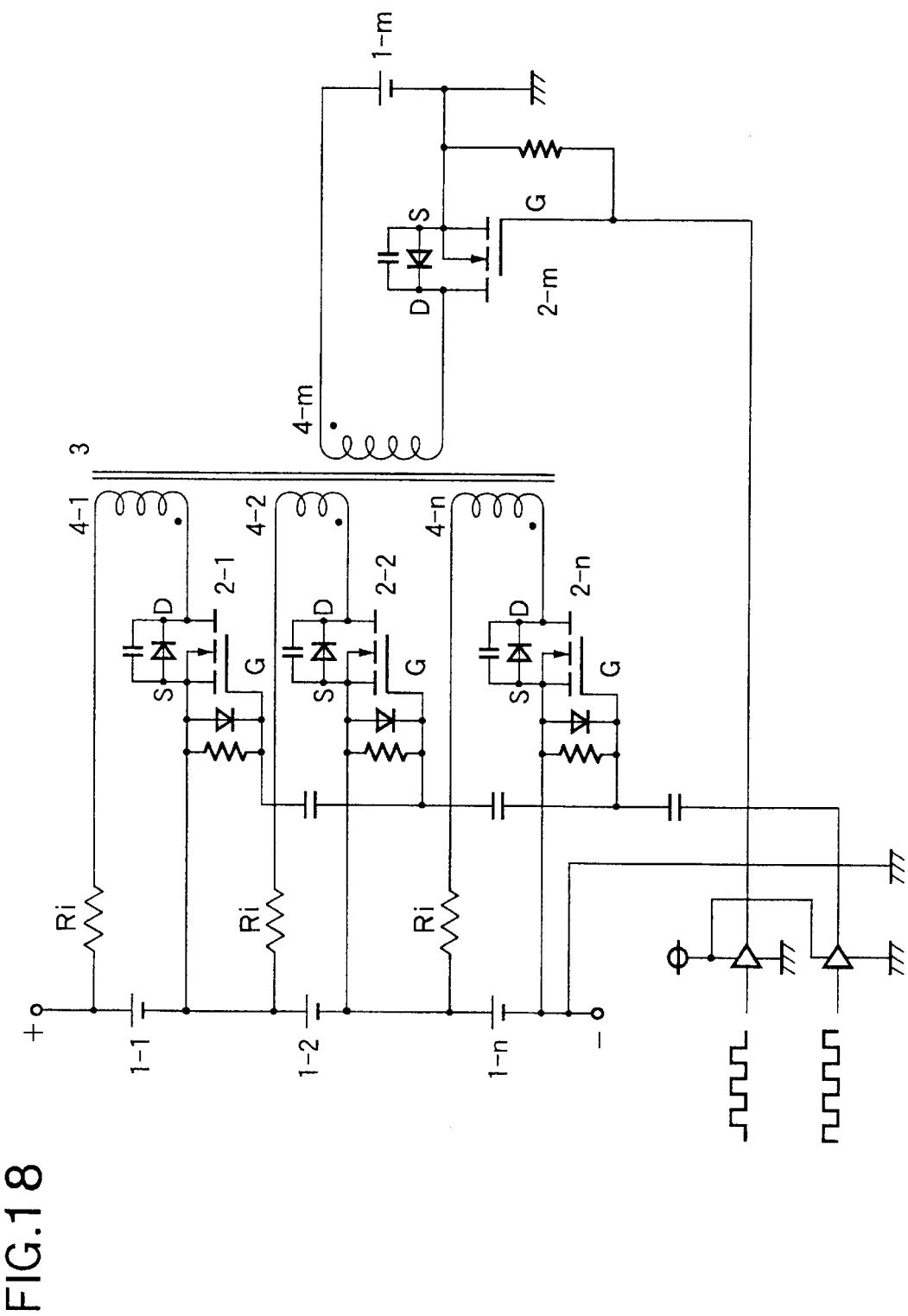
FIG. 18 is a diagram showing a voltage equalizing apparatus having a resistor provided in a first closed circuit.

Furthermore, there is also a method to insert a resistor Ri in each closed circuit composed of the secondary windings 4-1 to 4-n, the switching devices 2-1 to 2-n, and the battery devices 1-1 to 1-n, as shown in FIG. 18. This resistor Ri is chosen to be of a sufficiently large resistance value in comparison with each combined resistance value because it absorbs the ratio of dispersion of the combined resistance of the internal resistance of each battery device, the line resistance, the ON resistance of FET, the winding resistance of the transformer, and the like. By this resistor Ri, the ratio of dispersion of the combined resistance of each closed circuit is reduced, so that it is possible to equalize the voltage between the terminals of the battery devices with a high accuracy. This method to use the resistor Ri is a quite convenient and practical one, which is applicable to every circuit in the present invention.

Second Embodiment

Figure 4:
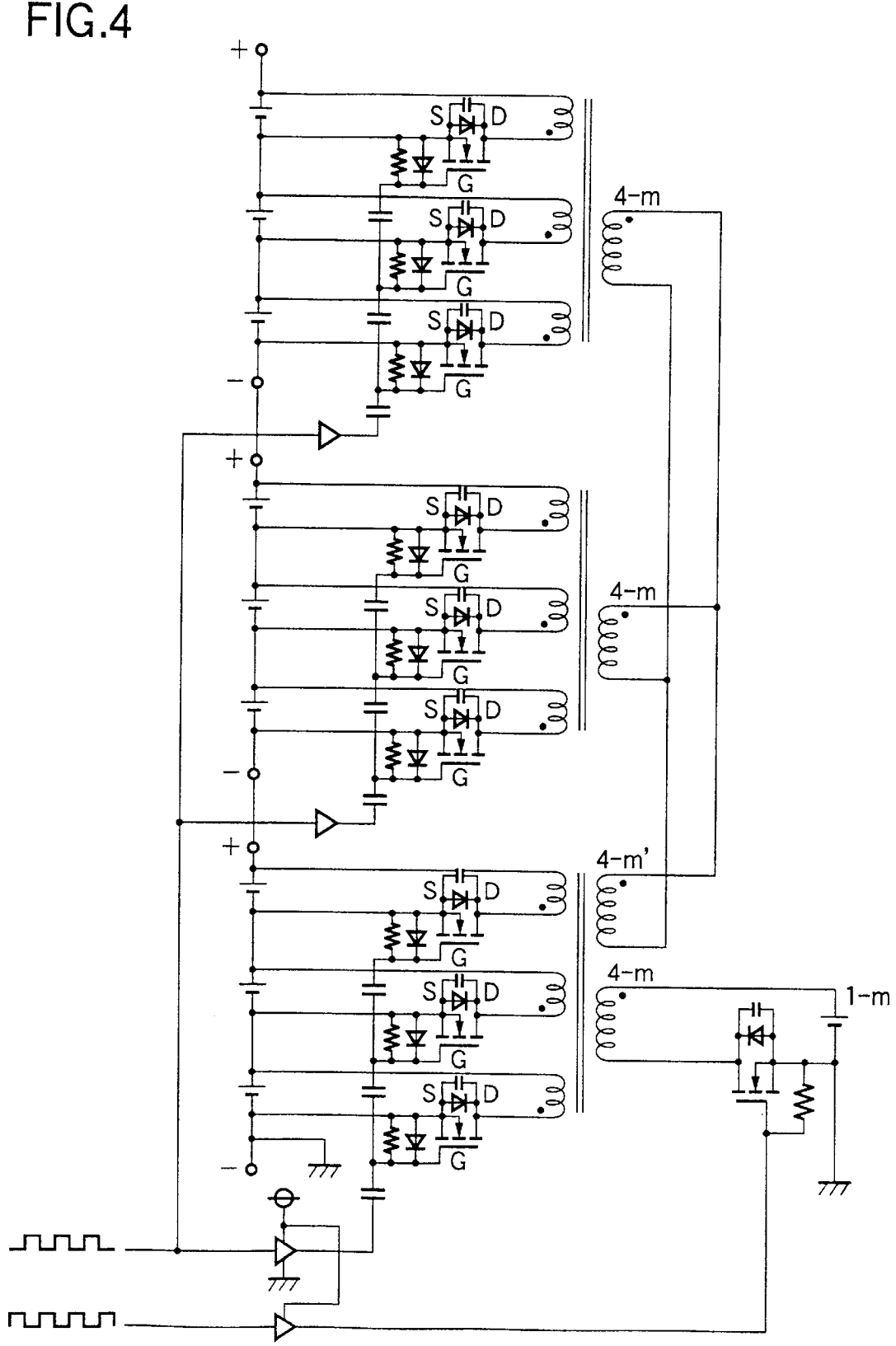
FIG. 4 is a diagram showing a voltage equalizing apparatus for battery devices in accordance with a modification of the second embodiment of the invention.

A second embodiment of the present invention is described below with reference to FIG. 3. In FIG. 3, the basic circuit of the present invention shown in FIG. 1 is treated as a single circuit. A plurality of such circuits (three circuits in FIG. 3) are provided, and a plurality of battery devices in respective circuits are interconnected in series. However, a battery device 1-m and a pulse supplying circuit for switching ON and OFF each switching device are used in common. Further, in FIG. 3, a circuit equalizing winding 4-m is common with an exciting winding from a battery device 1-m. However, the exciting winding and the circuit equalizing winding may be separate as shown in FIG. 4.

The operation of the second embodiment is basically the same as that of the first embodiment. However, voltage equalizing occurs also among the circuits similarly to that within a single circuit, whereby overall voltage equalizing is achieved. This configuration has a further effect that a required output voltage can be obtained by an appropriate combination of a plurality of single circuits.

Figure 5:
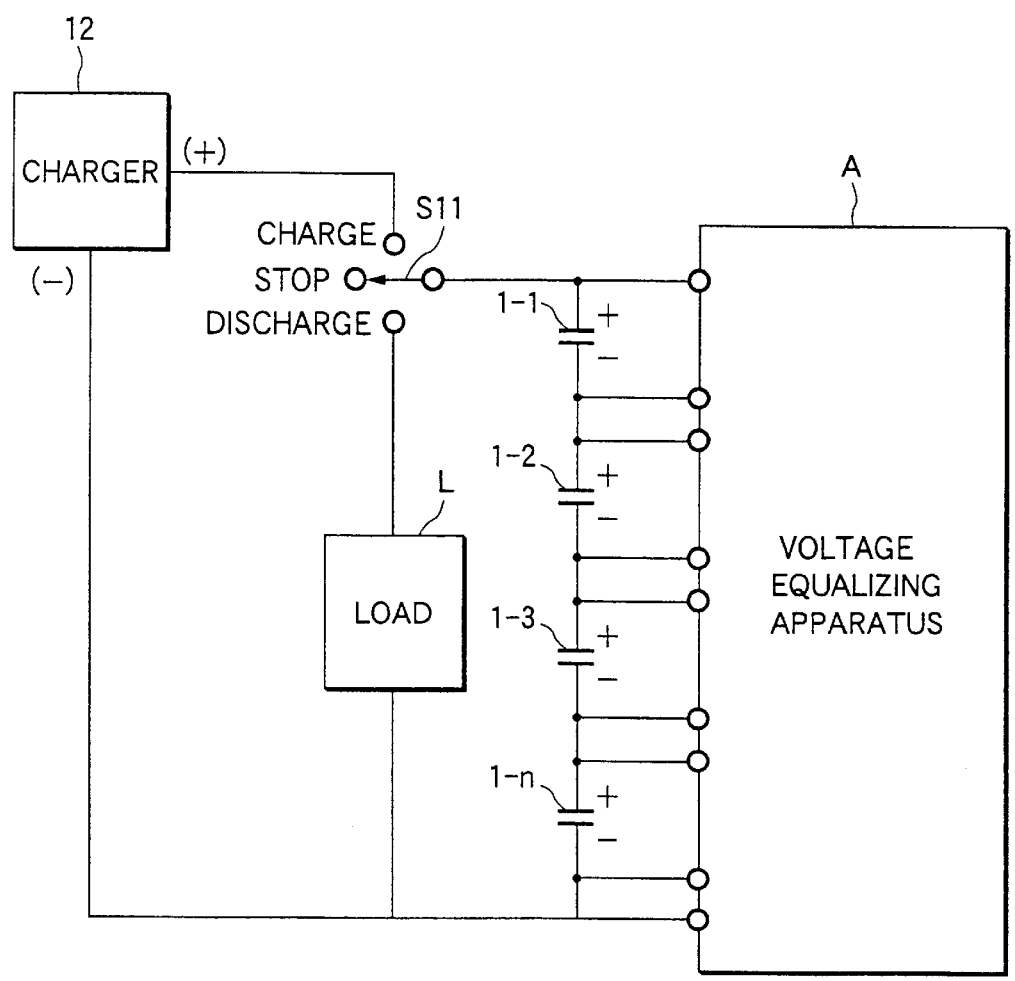
FIG. 5 is a diagram showing the relation between a voltage equalizing apparatus for battery devices and both an external power supply and a load.

FIG. 5 shows the usage of a voltage equalizing apparatus for battery devices in accordance with the present invention. In FIG. 5, Numerals 1-1 to 1-n are plurality of battery devices interconnected in series. Numeral A is a voltage equalizing apparatus. Numeral 12 is an external charger. Numeral L is a load. Numeral S11 is a switch. In case that a plurality of battery devices interconnected in series are used as a driving cell for a hybrid car which travels with the engine as well as the motor or an electric car which travels only with the motor, the load is an electric motor for driving the car. With the switch S11 setting to charging mode, the charger performs charging by using electric power generated by a generator during the running of the car by gasoline motor. During the running by driving cell, the switch S11 is set to discharging mode to drive the electric motor.

As such, when a voltage equalizing apparatus (method) for battery devices in accordance with the present invention is applied to a hybrid car using the combination of an engine and a motor and an electric car using a motor alone, the output voltages are equalized among a plurality of battery devices interconnected in series necessary for driving the electric motor for running, whereby the output power of the cell is used efficiently. Therefore, the emission of carbon dioxide and the like is reduced, which contributes to the protection of global environment.

During the charge from the charger and the discharge to the load by the battery devices interconnected in series, a large current flows in each of the battery devices interconnected in series. The large current causes a large voltage drop across the internal resistance of each battery device, thereby affecting the voltage detection of each battery device. Therefore, the voltage equalizing operation by the voltage equalizing apparatus is preferably stopped for such duration.

In FIGS. 1 and 3, a switching device of FET is used. However, a switching device of the present invention is not restricted to an FET. That is, another switching device, such as a transistor and a thyristor, may be used. When a transistor and the like is used, a diode for flowing a current in the reverse direction for the OFF duration of the switching device is preferably connected in parallel.

A battery device may by a battery cell, such as a lead-acid battery, a nickel-hydrogen cell, a lithium ion cell, and a polymer lithium cell. Further, a battery device may be an electrical double layer capacitor. The type of each battery device 1-1 to 1-n interconnected in series may be the same as or different from that of the battery device 1-m. A plurality of battery devices 1-1 to 1-n interconnected in series may be used also as a second battery device as shown in FIG. 6.

Third Embodiment

Figure 9:
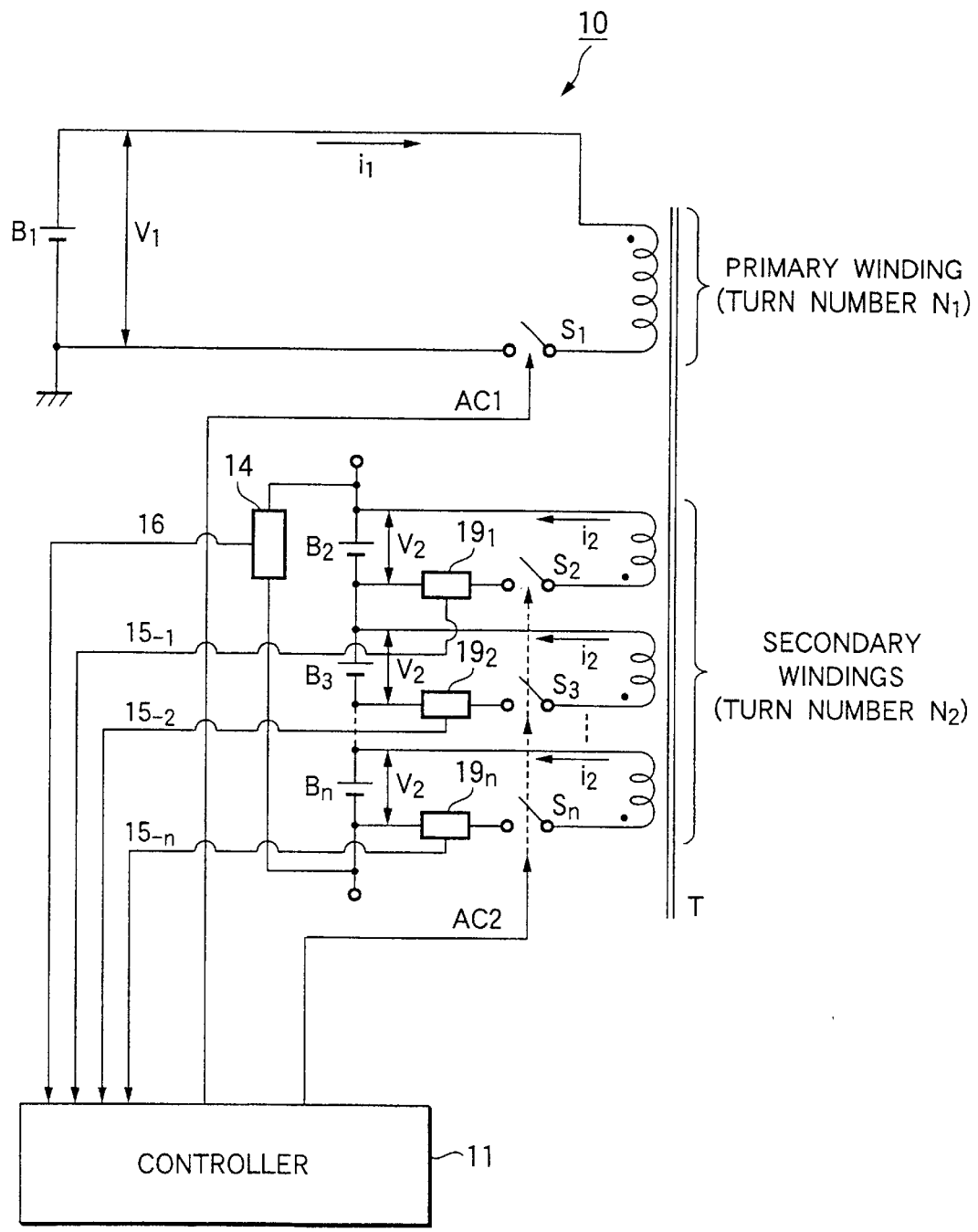
FIG. 9 is a circuit diagram showing the fundamental configuration of a voltage equalizing apparatus for battery devices in accordance with a third embodiment of the invention.

A third embodiment is described below. FIG. 9 is a circuit diagram showing the fundamental configuration of a voltage equalizing apparatus according to the third embodiment. As shown in FIG. 9, the voltage equalizing apparatus 10 comprises a plurality of first battery devices B2 to Bn interconnected in series. A closed circuit is formed by each of the first battery devices B2 to Bn, each of a plurality of secondary windings (with turn number $N_2$) magnetically interconnected with each other through a transformer T, and each of a plurality of first switching devices S2 to Sn.

In addition to the first battery devices B2 to Bn, a second battery device B1 is provided. The second battery device B1 may be used in common with a DC power supply, a charger, or a generator. A closed circuit is formed by the second battery device B1, a primary winding (with turn number $N_1$) magnetically interconnected with the secondary windings in common, and a second switching device S1.

The activation of the second switching device S1 is controlled by a control signal AC1, while the activation of the first switching devices S2 to Sn is controlled simultaneously by a control signal AC2. The control signal AC1 and the control signal AC2 are transmitted from a controller 11. The control signal AC1 and the control signal AC2 control the activation so that when the second switching device S1 is ON, the first switching devices S2 to Sn are OFF, and that when the first switching devices S2 to Sn are ON, the second switching device S1 is OFF. Accordingly, the activation is controlled so that the first switching devices and the second switching device are alternately turned ON and OFF, whereby energy is transported from the second battery device B1 to each of the first battery devices B2 to Bn. Since the secondary windings are connected to a common core, a charging current flows through a battery device having the lowest voltage among the first battery devices B2 to Bn. As a result, the voltages of the first battery devices B2 to Bn are equalized.

Alternatively, each of a current detector 19-1 to 19-n may be provided in each closed circuit composed of one of the secondary windings, one of the first switching devices S2 to Sn, and one of the first battery devices B2 to Bn. By virtue of this, the current flowing through each closed circuit is detected. Current signals 15-1 to 15-n detected by the current detector 19-1 to 19-n are transmitted to the controller 11. For example, in case that a current transformer is used as each a current detector 19-1 to 19-n, and that the timing of the polarity inversion of the output of each transformer is detected, the time of completion of the release of the exciting energy of the transformer T is detected. This gives the time of completion of the transportation of a predetermined amount of energy, which is described later in the control method of the voltage equalizing apparatus.

Further, a voltage detector 14 may be provided, for example, between the positive terminal of the first battery device B2 and the negative terminal of the first battery device Bn. The detected voltage signal 16 is transmitted to the controller 11. In case that a duration when the second switching device S1 and the first switching devices S2 to Sn are OFF simultaneously is provided in the duration between the switching-OFF of the second switching device S1 and the switching-ON of the first switching devices S2 to Sn and in the duration between the switching-OFF of the first switching devices S2 to Sn and the switching-ON of the second switching device S1, the zero-volt switching is achieved in which the second switching device S1 or the first switching devices S2 to Sn are turned ON in the situation that no charge exists in the capacitance components across these switching devices.

Figure 10:
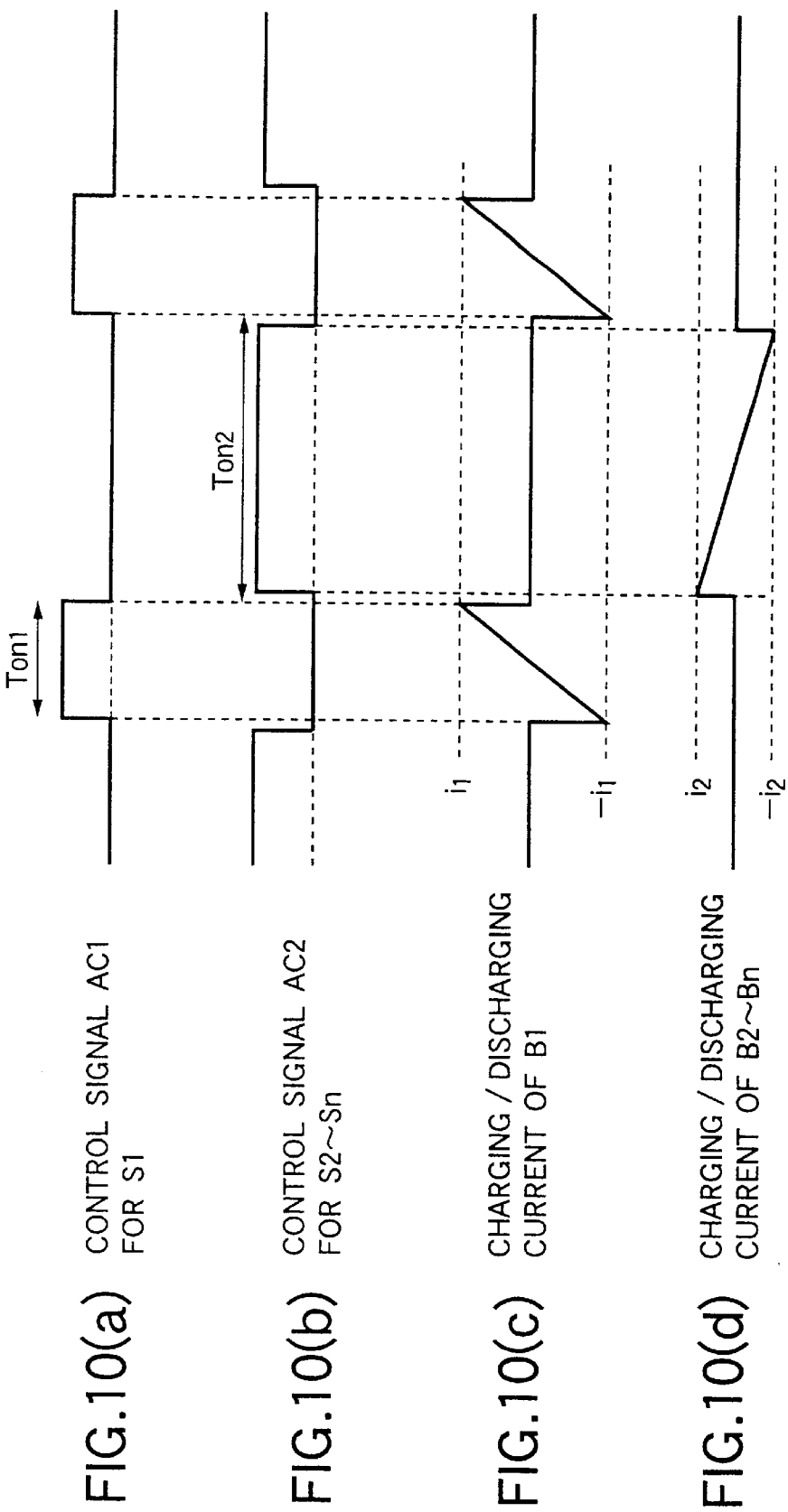
FIG. 10($a$) shows S1, FIG. 10($b$) shows S2 to Sn, FIG. 10($c$) shows the charging and discharging current of B1, and FIG. 10($d$) shows the charging and discharging current of B2 to Bn, respectively.

Described below is the situation in which the voltages of the first battery devices B2 to Bn are equalized in the circuit shown in FIG. 9. Here, $V_2$ denotes the voltage of each of the first battery devices B2 to Bn, while i2 denotes the charging and discharging current. $T_{ON1}$ denotes the ON duration of the second switching device Si, while $T_{ON2}$ denotes the ON duration of the first switching devices S2 to Sn. $V_1$ denotes the voltage of the second battery device B1, while i1 denotes the charging and discharging current. FIG. 10 is a timing diagram showing the relation between these quantities.

In the circuit shown in FIG. 9, since the turn number of the primary winding is $N_1$, and since the turn number of the secondary winding is $N_2$, the relation shown by the following Eq. (1) holds.

$$N_1 i_1 = n N_2 i_2 \quad (1)$$

According to Eq. (1), the charging and discharging current i2 to the first battery devices B2 to Bn is expressed by the following Eq. (2).

$$i2 = N1 i1 / n N_2 \quad (2)$$

From the ON duration $T_{ON1}$ of the second switching device S1, the charging and discharging current i1 from the second battery device B1, and the inductance $L_1$ of the primary winding, the voltage $V_1$ of the second battery device B1 is expressed by the following Eq. (3).

$$V_1 = 2 \times i_1 L_1 / T_{ON1} \quad (3)$$

Similarly, from the ON duration $T_{ON2}$ of the first switching device S2, the charging and discharging current i2 from the first battery devices B2 to Bn, and the inductance $L_2$ of a single secondary winding, the equalized voltage $V_2$ of the first battery devices B2 to Bn is expressed by the following Eq. (4).

$$V_2 = 2 n \times i_2 L_2 / T_{ON2} \quad (4)$$

Substituting Eq. (2) into Eq. (4), the following Eq. (5) is obtained.

$$V_2 = 2 \times (N_1/N_2) i_1 L_2 / T_{ON2} \quad (5)$$

From Eqs. (3) and (5), the ratio $V_1/V_2$ is expressed by the following Eq. (6).

$$V_1/V_2 = (L_1/L_2) \times (N_2/N_1) \times (T_{ON2}/T_{ON1}) \quad (6)$$

Since the relation between the inductance and the turn number is expressed by $L_1/L_2 = N_1^2/N_2^2$, the ratio $V_1/V_2$ is expressed by the following Eq. (7).

$$V_1/V_2 = (N_1^2/N_2^2) \times (N_2/N_1) \times (T_{ON2}/T_{ON1})$$
$$= (N_1/N_2) \times (T_{ON2}/T_{ON1}) \quad (7)$$

As seen from Eq. (7), the $V_1/V_2$ between the voltage $V_1$ of the second battery device B1 and the equalized voltage $V_2$ of the first battery devices B2 to Bn is determined by setting the ON-duration ratio $T_{ON2}/T_{ON1}$ between the ON duration $T_{ON2}$ of the first switching devices S2 to Sn and the ON duration $T_{ON1}$ of the second switching device S1.

In a method of controlling a voltage equalizing apparatus according to the third embodiment, when the voltage of the second battery device B1 as the source of energy transportation or reception is $V_1$, in order to set the voltages of the first battery devices B2 to Bn to be a predetermined voltage $V_2$, the ON-duration ratio $T_{ON2}/T_{ON1}$ is set to a value calculated from the relation of Eq. (7), whereby the controller 11 outputs an control signal AC1 and an control signal AC2, thereby controlling the activation of the second switching device S1 and the first switching devices S2 to Sn.

Further, a method of controlling a voltage equalizing apparatus according to the third embodiment may be implemented in the following control method. First, the ON-duration ratio $TO_{N2}/T_{ON1}$ is set to a value causing the voltages of the first battery devices to exceed $V_2$, and then energy transportation is carried out immediately before the voltages of the first battery devices actually exceed $V_2$. The monitoring of the voltages can be carried out, for example, by the controller 11 monitoring the voltage obtained from the voltage detector 14. Next, the controller 11 resets the ON-duration ratio $T_{ON2}/T_{ON1}$ to a value causing the voltages to be $V_2$, and then energy transportation is carried out until the voltages becomes $V_2$, whereby the voltages of the first battery devices are finally set to $V_2$. By virtue of this, the voltages of the first battery devices B2 to Bn are set to a desired voltage in a shorter time.

Furthermore, a method of controlling a voltage equalizing apparatus according to the third embodiment may be implemented in the following control method. Here, frequency f is defined as the reciprocal of the sum of the ON duration $T_{ON1}$ of the second switching device and the ON duration $TON_2$ of the first switching devices, as shown by the following Eq. (8). Here, the duration when the second switching device and the first switching devices are OFF simultaneously is generally very short and hence neglected.

$$f = 1/(T_{ON1} + T_{ON2}) \quad (8)$$

With maintaining the ON-duration ratio $T_{ON2}/T_{ON1}$ the frequency f is set to a low frequency (a frequency lower than that in the stationary state), and then energy transportation is carried out. This reduces the time necessary for the energy transportation from the second battery device B1 to each of the first battery devices B2 to Bn and vice versa.

Further, a method of controlling a voltage equalizing apparatus according to the third embodiment may be implemented in the following control method. When the transportation of a predetermined amount of energy from the second battery device B1 to the first battery devices B2 to Bn and vice versa is completed and when the voltages of the first battery devices have been approximately equalized, the frequency f shown by Eq. (8) is set to a high frequency (a frequency higher than that in the stationary state). When the frequency f shown by Eq. (8) is set to a high frequency (a frequency higher than that in the stationary state) as described above, the amount of circulation energy after the completion of equalization is reduced, whereby the energy loss in the voltage equalizing apparatus is reduced.

Further, a method of controlling a voltage equalizing apparatus according to the third embodiment may be implemented in the following control method. When the transportation of a predetermined amount of energy from the second battery device B1 to the first battery devices B2 to Bn and vice versa is completed and when the voltages of the first battery devices B2 to Bn have been approximately equalized, the second switching device S1 and the first switching device S2 are turned OFF simultaneously. This reduces the energy loss in the voltage equalizing apparatus. When the voltage balance becomes poor, in order to avoid this, the second switching device S1 and the first switching device S2 are turned ON and OFF repeatedly again.

Fourth Embodiment

Figure 11:
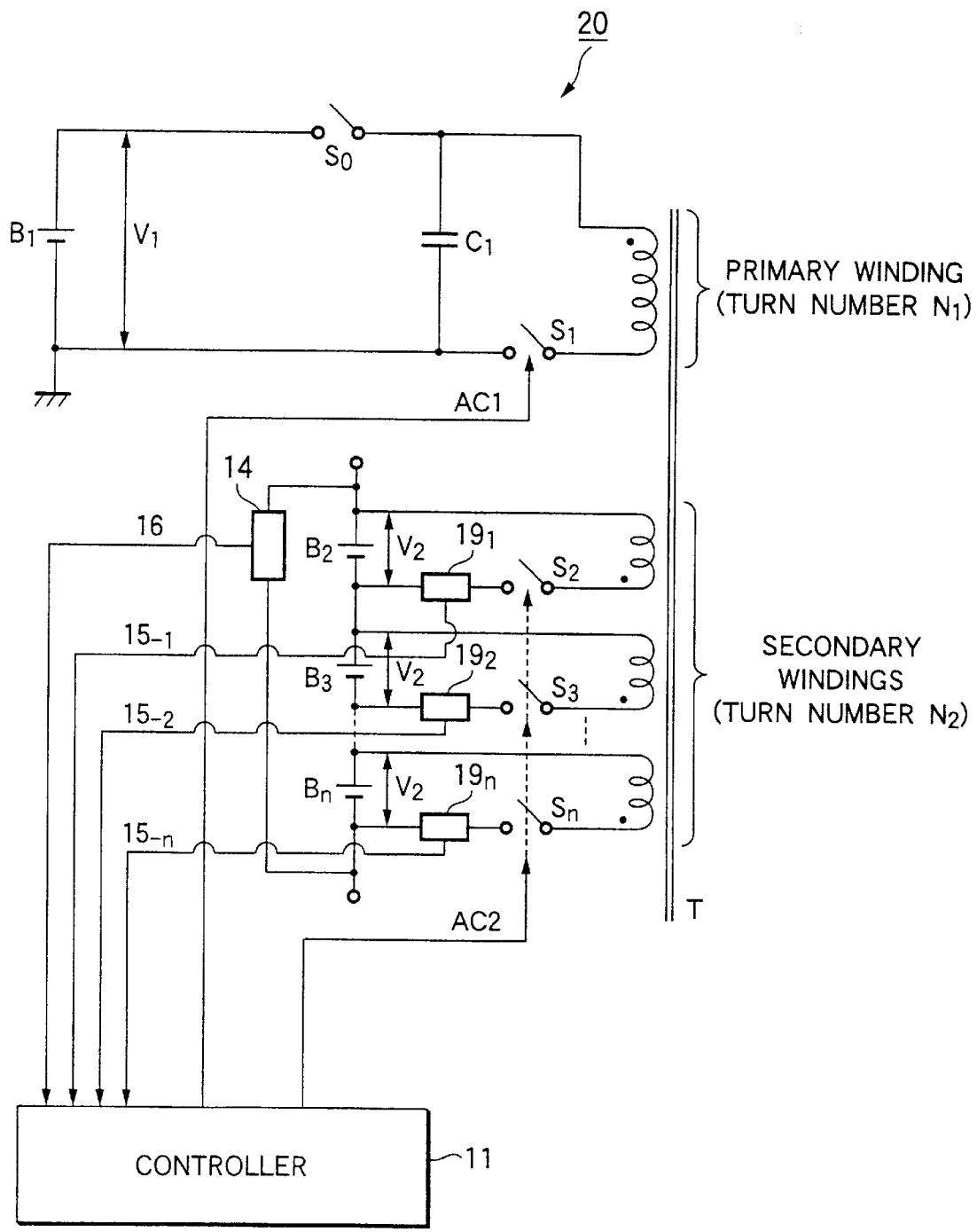
FIG. 11 is a circuit diagram showing the fundamental configuration of a voltage equalizing apparatus for battery devices in accordance with a fourth embodiment of the invention.

A fourth embodiment is described below. FIG. 11 is a circuit diagram showing the fundamental configuration of a voltage equalizing apparatus according to the fourth embodiment. As shown in FIG. 11, in addition to the configuration of the voltage equalizing apparatus 10 according to the third embodiment, the voltage equalizing apparatus 20 comprises: a third switching device S0 between the positive terminal of a second battery device B1 and a primary winding; and a third battery device C1 between the primary-side terminal of the third switching device S0 and the negative terminal of the second battery device B1. The position of the third switching device S0 may be between the negative terminal of the second battery device B1 and the second switching device S1. The third battery device C1 is preferably a battery device having a capacity smaller than that of the second battery device B1.

Described below is a method of controlling a voltage equalizing apparatus according to the fourth embodiment. In a method of controlling a voltage equalizing apparatus according to the third embodiment, the method of controlling a voltage equalizing apparatus according to the third embodiment is carried out until the transportation of a predetermined amount of energy from the second battery device B1 to the first battery devices B2 to Bn and vice versa is completed. After that, the third switching device S0 is turned OFF. Then, the ON/OFF operation of the second switching device S1 and the first switching device S2 is continued, whereby the equalization of the voltages of the first battery devices B2 to Bn is maintained.

When almost all of the energy to be transported has been completed, equalization is carried out efficiently in case that only a small amount of energy is transported between the primary winding and the secondary windings. Accordingly, the loss until the equalization of the voltages of the first battery devices B2 to Bn is reduced when the third switching device S0 is turned OFF and when the third battery device C1 having an energy capacity smaller than that of the second battery device B1 is used for equalization.

Fifth Embodiment

Figure 12:
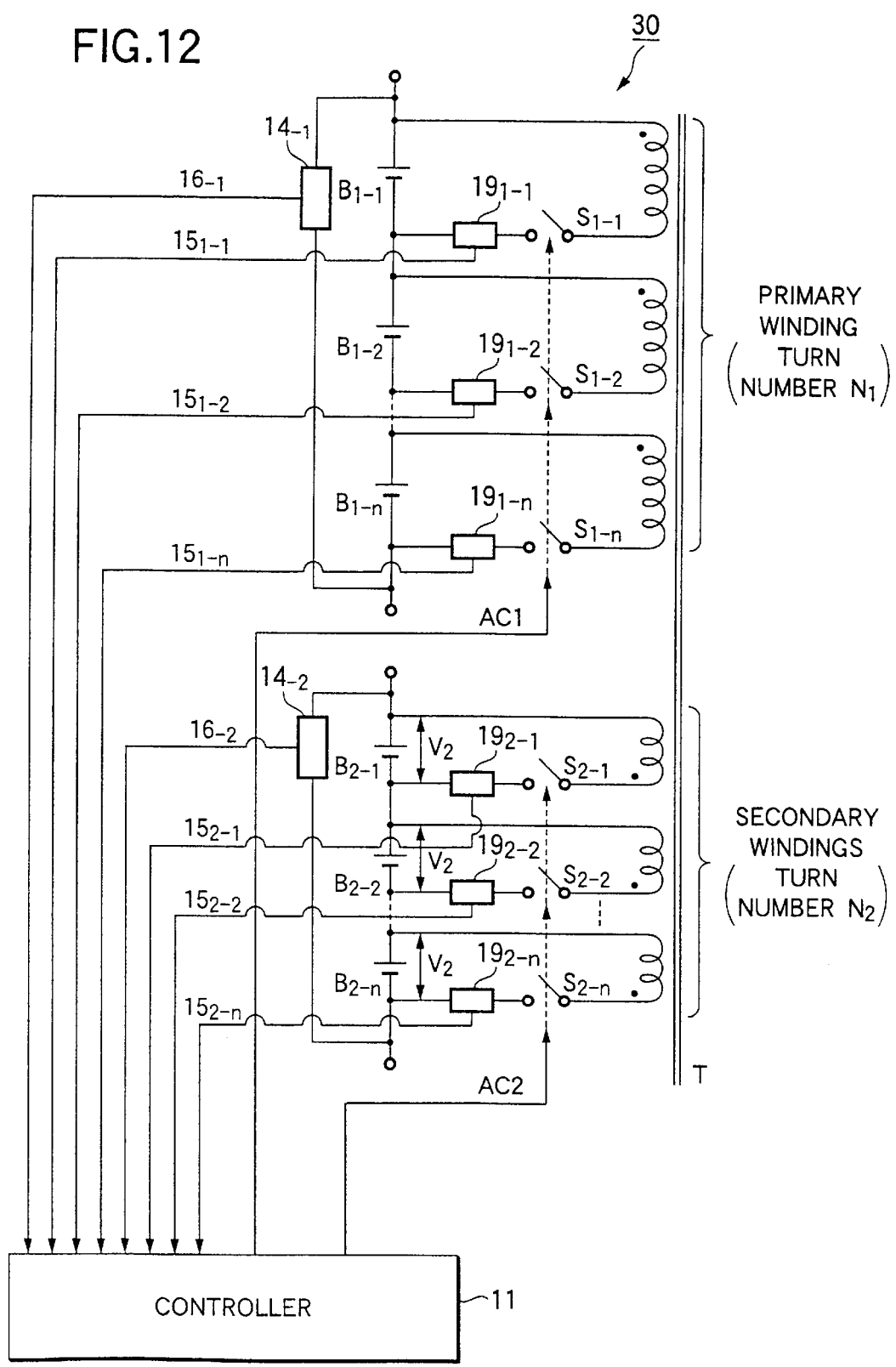
FIG. 12 is a circuit diagram showing the fundamental configuration of a voltage equalizing apparatus for battery devices in accordance with a fifth embodiment of the invention.

A fifth embodiment is described below. FIG. 12 is a circuit diagram showing the fundamental configuration of a voltage equalizing apparatus according to the fifth embodiment. As shown in FIG. 12, the voltage equalizing apparatus 30 comprises a plurality of first battery devices B2-1 to B2-n interconnected in series. A closed circuit is formed by each of the first battery devices B2-1 to B2-n, each of a plurality of secondary windings (with turn number $N_2$) magnetically interconnected with each other through a transformer T, and each of a plurality of first switching devices S2-1 to S2-n.

In addition to the first battery devices B2-1 to B2-n, a plurality of second battery devices B1-1 to B1-n are provided. A closed circuit is formed by each of the second battery devices B1-1 to B1-n, each of the a plurality of primary windings (with turn number $N_1$) magnetically interconnected with the secondary windings in common, and each of a plurality of second switching devices S1-1 to S1-n.

The activation of the second switching devices S1-1 to S1-n is controlled simultaneously by a control signal AC1, while the activation of the first switching devices S2-1 to S2-n is controlled simultaneously by a control signal AC2. The control signal AC1 and the control signal AC2 are transmitted from a controller 11. The control signal AC1 and the control signal AC2 control the activation so that when the second switching devices S1-1 to S1-n are ON, the first switching devices S2-1 to S2-n are OFF, and that when the first switching devices S2-1 to S2-n are ON, the second switching devices S1-1 to S1-n are OFF. Accordingly, the activation is controlled so that the first switching devices and the second switching devices are alternately turned ON and OFF, whereby energy is transported between each of the second battery devices B1-1 to B1-n and each of the first battery devices B2-1 to B2-n.

Since the primary windings and the secondary windings are connected to a common core, a charging current flows through a battery device having the lowest voltage among the second battery devices B1-1 to B1-n and the first battery devices B2-1 to B2-n. As a result, the voltages of the second battery devices B1-1 to B1-n or the first battery devices B2-1 to B2-n are equalized.

Alternatively, each of a current detector 191-1 to 191-n may be provided in each closed circuit composed of one of the primary windings, one of the second switching devices S1-1 to S1-n, and one of the second battery devices B1-1 to B1-n. Further, each of a current detector 192-1 to 192-n may be provided in each closed circuit composed of one of the secondary windings, one of the first switching devices S2-1 to S2-n, and one of the first battery devices B2-1 to B2-n. By virtue of this, the current flowing through each closed circuit is detected. Current signals 151-1 to 151-n and 152-1 to 152-n detected by the current detector 191-1 to 191-n and 192-1 to 192-n are transmitted to the controller 11.

Further, a voltage detector 14-1 may be provided, for example, between the positive terminal of the second battery device B1-1 and the negative terminal of the second battery device B1-n, while a voltage detector 14-2 may be provided between the positive terminal of the first battery device B2-1 and the negative terminal of the first battery device B2-n. The detected voltage signal 16-1 and 16-2 are transmitted to the controller 11.

As such, in the fifth embodiment, used are a plurality of second battery devices each of which is similar to that in the third embodiment. Accordingly, in addition to the effect of the third embodiment, the voltages of the second battery devices B1-1 to B1-n are also equalized.

In the fifth embodiment, since the second switching devices S1-1 to S1-n are controlled by a common control signal AC1, relations similar to Eqs. (1) to (8) are obtained. Accordingly, the voltage equalizing apparatus is controlled by a control method according to the third embodiment. The previous explanations have been described mainly for the case of energy transportation from the second battery device to the first battery devices. However, a feature of the fifth embodiment is that the backward energy transportation from the first battery devices to the second battery devices is also available.

According to the invention, a voltage equalizing apparatus for battery devices comprises:

a core;

a plurality of first battery devices interconnected in series, each consisting of one or more cells;

a plurality of secondary windings magnetically connected with each other through the core;

a plurality of a first switching devices composed of a first closed circuit by mutually connecting one of the plurality of secondary windings and the one of a plurality of first battery device; one or more second battery devices provided separately from said plurality of first battery devices interconnected in series or a second battery device provided by rendering the whole of said plurality of first battery devices interconnected in series one battery device; a primary winding magnetically connected with a plurality of the secondary windings through the core; and a second switching device composed of a second closed circuit by interconnected in series between the second battery device and the primary winding; wherein the plurality of first switching devices and the second switching device are alternately turned ON and OFF to equalize the output voltages of the plurality of first battery devices; when the second switching device is turned ON, exciting energy stored in the core is transported by the charging to the battery devices having lower voltages among said plurality of first battery devices, even after the transportation of said excitation energy is completed, said first switching devices continue to be turned ON, to effect the charging from the battery devices having higher voltages among said plurality of first battery devices to the battery devices having lower voltages among said plurality of first battery devices and/or to store energy in said core, thereby realizing the equalizing of the output voltages of the plurality of battery devices interconnected in series with a high efficiency and a high accuracy in equalizing by the apparatus in a reduced size. Furthermore, it becomes possible to equalize in a short period of time and also reduce the energy loss after the equalizing operation is ended.

Having described the preferred embodiments of the invention referring to the accompanying drawings, it should be understood that the present invention is not limited to those precise embodiments, and that various changes and modifications thereof could by made by one skilled in the art without departing from the spirit or scope of the invention as defined in the appended claims.

What is claimed is:

1. A voltage equalizing apparatus for battery devices comprising:
   a core;
   a plurality of first battery devices interconnected in series with each other, each consisting of one or more cells;
   a plurality of secondary windings magnetically connected with each other through the core;
   a plurality of first switching devices, each connected to one of the plurality of secondary windings and one of the plurality of first battery devices to constitute a first closed circuit;
   one or more second battery devices;
   a primary winding magnetically connected with the plurality of secondary windings through the core; and
   a second switching device connected in series with the second battery device and the primary winding to constitute a second closed circuit;
   wherein the plurality of first switching devices and the second switching device are alternately turned ON and OFF to equalize the output voltages of the plurality of first battery devices;
   when the second switching device is turned ON, exciting energy stored in the core is transported by the charging to the battery devices having lower voltages among said plurality of first battery devices; and
   the plurality of first switching devices continue to be turned ON after completion of the transportation of the exciting energy, to effect the charging from the battery devices having higher voltages among said plurality of first battery devices to the battery devices having lower voltages among said plurality of first battery devices and/or to store energy in said core.

2. A voltage equalizing apparatus for battery devices according to claim 1,
   wherein said plurality of first battery devices are made a battery for driving a hybrid car which travels with an engine as well as a motor or an electric car which travels only with a motor.

3. A voltage equalizing apparatus for battery devices according to claim 1, wherein a resistor is provided in said first closed circuit.

4. A voltage equalizing apparatus for battery devices according to claim 1,
   wherein said second battery device is a capacitor.

5. A voltage equalizing apparatus for battery devices comprising:
   a core;
   a plurality of first battery devices interconnected in series with each other, each consisting of one or more cells;
   a plurality of secondary windings magnetically connected with each other through the core;
   a plurality of first switching devices, each connected to one of the plurality of secondary windings and one of the plurality of first battery devices to constitute a first closed circuit;
   a primary winding magnetically connected with the plurality of secondary windings through the core; and
   a second switching device connected between a second battery device, which the whole of said plurality of first battery devices interconnected in series has, been rendered, and the primary winding to constitute a second closed circuit;
   wherein the plurality of first switching devices and the second switching device are alternately turned ON and OFF to equalize the output voltages of the plurality of first battery devices;
   when the second switching devices are turned ON, exciting energy stored in the core is transported by the charging to the battery devices having lower voltages among said plurality of first battery devices;
   the plurality of first switching devices continue to be turned ON after completion of the transportation of the exciting energy, to effect the charging from the battery devices having higher voltages among the plurality of first battery devices to the battery devices having lower voltages among the plurality of first battery devices and/or to store energy in the core.

6. A voltage equalizing apparatus for battery devices according to claim 2,
   wherein said plurality of first battery devices are made a battery for driving a hybrid car which travels with an engine as well as a motor or an electric car which travels only with a motor.

7. A voltage equalizing apparatus for battery devices according to claim 2, wherein a resistor is provided in said first closed circuit.

* * * * *